US010586395B2

(12) United States Patent
Mullins et al.

(10) Patent No.: US 10,586,395 B2
(45) Date of Patent: Mar. 10, 2020

(54) REMOTE OBJECT DETECTION AND LOCAL TRACKING USING VISUAL ODOMETRY

(71) Applicant: DAQRI, LLC, Los Angeles, CA (US)

(72) Inventors: Brian Mullins, Altadena, CA (US); Daniel Wolf, Vienna (AT); Jakob Zillner, Vienna (AT); Branislav Micusik, Kierling (AT); William Hoff, Vienna (AT)

(73) Assignee: DAQRI, LLC, Los Angeles, CA (US)

( * ) Notice: Subject to any disclaimer, the term of this patent is extended or adjusted under 35 U.S.C. 154(b) by 67 days.

(21) Appl. No.: 15/974,998

(22) Filed: May 9, 2018

(65) Prior Publication Data

US 2018/0261012 A1 Sep. 13, 2018

Related U.S. Application Data

(63) Continuation-in-part of application No. 15/592,939, filed on May 11, 2017, now Pat. No. 9,990,759, (Continued)

(51) Int. Cl.
*G06F 15/16* (2006.01)
*G06T 19/00* (2011.01)
(Continued)

(52) U.S. Cl.
CPC .......... *G06T 19/006* (2013.01); *G06F 1/1694* (2013.01); *G06T 1/20* (2013.01);
(Continued)

(58) Field of Classification Search
CPC ........ G06T 19/006; G06T 1/20; G06F 1/1694
(Continued)

(56) References Cited

U.S. PATENT DOCUMENTS 8,681,178 B1 * 3/2014 Tseng .................... G06T 19/006
345/629
8,810,599 B1 * 8/2014 Tseng .................... G05D 1/0278
345/633
(Continued)

FOREIGN PATENT DOCUMENTS

WO WO-2013093906 A1 6/2013
WO WO-2015102834 A1 7/2015

OTHER PUBLICATIONS

"U.S. Appl. No. 14/144,359, Notice of Allowance dated Dec. 9, 2015", 12 pgs.
(Continued)

*Primary Examiner* — Duyen M Doan
(74) *Attorney, Agent, or Firm* — Schwegman Lundberg & Woessner, P.A.

(57) ABSTRACT

A system and method for offloading object detection are described. A server receives first sensor data from a first sensor of an augmented reality (AR) display device. The first sensor data indicates a pose of the AR display device relative to a first reference coordinate system. The server detects a physical object using second sensor data received from a second sensor of the AR display device. The server determines, based on the second sensor data, a pose of the physical object relative to the AR display device. The server then determines the pose of the physical object relative to the first reference coordinate system based on the pose of the physical object relative to the AR display device and the pose of the AR display device relative to the first reference coordinate system.

20 Claims, 22 Drawing Sheets

Related U.S. Application Data which is a continuation of application No. 15/041,437, filed on Feb. 11, 2016, now Pat. No. 9,672,660, which is a continuation of application No. 14/144,359, filed on Dec. 30, 2013, now Pat. No. 9,264,479.

(51) Int. Cl.
*H04L 29/08* (2006.01)
*G06F 1/16* (2006.01)
*H04L 29/06* (2006.01)
*H04W 4/02* (2018.01)
*G06T 1/20* (2006.01)

(52) U.S. Cl.
CPC .............. *H04L 67/04* (2013.01); *H04L 67/12* (2013.01); *H04L 67/18* (2013.01); *H04L 67/22* (2013.01); *H04L 67/38* (2013.01); *H04W 4/026* (2013.01); *G06T 2200/16* (2013.01)

(58) Field of Classification Search
USPC .................................................. 709/203, 219
See application file for complete search history.

(56) References Cited

U.S. PATENT DOCUMENTS

| | | | |
|---|---|---|---|
| 9,082,149 B2 | 7/2015 | Argue et al. | |
| 9,264,479 B2 | 2/2016 | Mullins | |
| 9,338,622 B2 | 5/2016 | Bjontegard | |
| 9,672,660 B2 | 6/2017 | Mullins | |
| 9,686,466 B1 | 6/2017 | Billinghurst et al. | |
| 9,990,759 B2 | 6/2018 | Mullins | |
| 2002/0057280 A1 | 5/2002 | Anabuki et al. | |
| 2004/0257444 A1 | 12/2004 | Maruya et al. | |
| 2006/0240808 A1 | 10/2006 | Crolley | |
| 2007/0061101 A1 | 3/2007 | Greene et al. | |
| 2007/0066323 A1 | 3/2007 | Park et al. | |
| 2008/0071559 A1 | 3/2008 | Arrasvuori | |
| 2009/0102859 A1 | 4/2009 | Athsani et al. | |
| 2010/0026714 A1 | 2/2010 | Utagawa | |
| 2010/0045662 A1 | 2/2010 | Boothroyd et al. | |
| 2010/0208029 A1 | 8/2010 | Marti et al. | |
| 2011/0231781 A1 | 9/2011 | Betzler et al. | |
| 2011/0246276 A1 | 10/2011 | Peters et al. | |
| 2012/0114297 A1 | 5/2012 | Adhikari et al. | |
| 2012/0122491 A1 | 5/2012 | Kim et al. | |
| 2012/0212405 A1 | 8/2012 | Newhouse et al. | |
| 2012/0249416 A1 | 10/2012 | Maciocci et al. | |
| 2013/0002649 A1 | 1/2013 | Wu et al. | |
| 2013/0069986 A1* | 3/2013 | Fock | G06K 9/605 345/633 |
| 2013/0091239 A1 | 4/2013 | Hao et al. | |
| 2013/0113993 A1 | 5/2013 | Dagit, III | |
| 2013/0178257 A1* | 7/2013 | Langseth | G06T 17/05 463/4 |
| 2013/0198176 A1 | 8/2013 | Kim | |
| 2013/0257907 A1* | 10/2013 | Matsui | G09G 5/377 345/633 |
| 2013/0286048 A1 | 10/2013 | Sternitzke | |
| 2014/0002496 A1 | 1/2014 | Lamb et al. | |
| 2014/0016820 A1 | 1/2014 | Roberts et al. | |
| 2014/0132484 A1* | 5/2014 | Pandey | G02B 27/0172 345/8 |
| 2014/0173674 A1 | 6/2014 | Wolman et al. | |
| 2014/0267408 A1 | 9/2014 | Mullins | |
| 2014/0282220 A1* | 9/2014 | Wantland | G06F 3/04845 715/782 |
| 2015/0032838 A1 | 1/2015 | Demsey | |
| 2015/0070262 A1 | 3/2015 | Peters et al. | |
| 2015/0188984 A1 | 7/2015 | Mullins | |
| 2016/0163112 A1 | 6/2016 | Mullins | |
| 2017/0249774 A1 | 8/2017 | Mullins | |
| 2018/0095542 A1* | 4/2018 | Mallinson | G06F 1/163 |
| 2019/0197339 A1* | 6/2019 | Han | G06K 9/4604 |

OTHER PUBLICATIONS

"U.S. Appl. No. 14/144,359, Preliminary Amendment filed Apr. 28, 2015", 8 pgs.
"U.S. Appl. No. 15/041,437, Final Office Action dated Sep. 23, 2016", 8 pgs.
"U.S. Appl. No. 15/041,437, Non Final Office Action dated May 20, 2016", 13 pgs.
"U.S. Appl. No. 15/041,437, Notice of Allowance dated Jan. 27, 2017", 9 pgs.
"U.S. Appl. No. 15/041,437, Response filed Aug. 22, 2016 to Non Final Office Action dated May 20, 2016", 9 pgs.
"U.S. Appl. No. 15/041,437, Response filed Dec. 12, 2016 to Final Office Action dated Sep. 23, 2016", 8 pgs.
"U.S. Appl. No. 15/592,939, Non Final Office Action dated Dec. 1, 2017", 11 pgs.
"U.S. Appl. No. 15/592,939, Notice of Allowance dated Feb. 5, 2018", 8 pgs.
"U.S. Appl. No. 15/592,939, Response filed Dec. 21, 2017 to Non Final Office Action dated Dec. 1, 2017", 8 pgs.
"European Application Serial No. 14875991.3, Extended European Search Report dated Jul. 26, 2017", 8 pgs.
"International Application Serial No. PCT/US2014/069536, International Preliminary Report on Patentability dated Nov. 27, 2015", 21 pgs.
"International Application Serial No. PCT/US2014/069536, International Search Report dated Mar. 12, 2015", 2 pgs.
"International Application Serial No. PCT/US2014/069536, Response filed Oct. 27, 2015 to Written Opinion dated Mar. 12, 2015", 4 pgs.
"International Application Serial No. PCT/US2014/069536, Written Opinion dated Mar. 12, 2015", 4 pgs.

* cited by examiner ent of modules (e.g., components) of an augmented reality
REMOTE OBJECT DETECTION AND LOCAL TRACKING USING VISUAL ODOMETRY

RELATED APPLICATIONS

The present application is a continuation-in-part of U.S. patent application Ser. No. 15/592,939, filed May 11, 2017, which claims the benefit of priority, under 35 U.S.C. § 120, to U.S. patent application Ser. No. 15/041,437, filed Feb. 11, 2016, which claims the benefit of priority, under 35 U.S.C. § 120, to U.S. patent application Ser. No. 14/144,359, entitled "Offloading Augmented Reality Processing", filed on Dec. 30, 2013, which is by way of reference incorporated herein in its entirety.

TECHNICAL FIELD

The subject matter disclosed herein generally relates to the processing of data. Specifically, the present disclosure addresses systems and methods for remote object detection and local tracking using visual odometry.

BACKGROUND

A device can be used to generate and display data in addition to an image captured with the device. For example, augmented reality (AR) is a live, direct or indirect view of a physical, real-world environment whose elements are augmented by computer-generated sensory input such as sound, video, graphics, or GPS data. With the help of advanced AR technology (e.g., adding computer vision and object recognition) the information about the surrounding real world of the user becomes interactive. Device-generated (e.g., artificial) information about the environment and its objects can be overlaid on the real world. However, small portable devices have limited computing resources that limit the rendering of device-generated objects.

BRIEF DESCRIPTION OF THE DRAWINGS

Some embodiments are illustrated by way of example and not limitation in the figures of the accompanying drawings.

DETAILED DESCRIPTION

Figure 1:
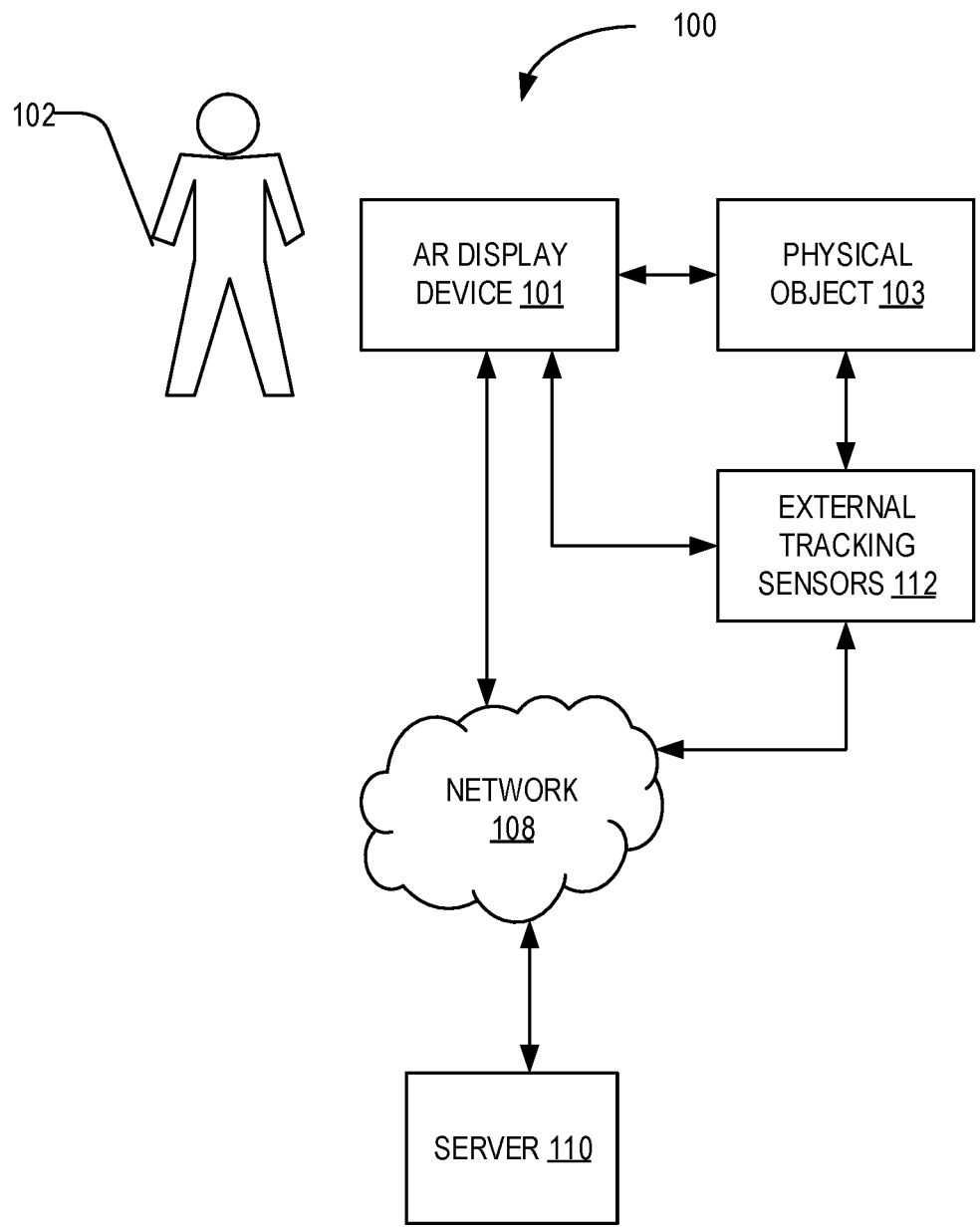
FIG. 1 is a block diagram illustrating an example of a network suitable for offloading processes to an augmented reality server, according to some example embodiments.

Example methods and systems are directed to offloading object detection. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional virtual object overlaid on an image of a physical object captured by a camera of an AR display device. A rendering of the three-dimensional virtual object may be based on a position of the AR display device relative to the physical object or relative to another frame of reference so that the virtual object appears aligned with the physical object as perceived by the user of the AR display device. For example, graphics (e.g., graphical elements containing instructions and guides) appear to be attached to a physical object of interest. In order to do this, the AR display device detects the physical object and tracks a pose of the AR display device and a pose of the object. A pose identifies a location and orientation of the object relative to a frame of reference or relative to another object. Object detection and tracking can be a very computation-intensive task, especially for wearable AR display devices with limited computational power. Performing object detection and tracking on the pose of the object can be slow, resulting in a lag time in viewing the virtual objects. The lag time further results in destroying the illusion of the virtual objects co-existing in the real world.

Present state of the art often uses convolutional neural networks for robust object pose estimation that may require powerful graphical processing units in order to achieve real-time object detection. Object detection and tracking may be a computationally intensive task, especially for viewing devices with limited computational power such as wearable augmented reality devices. A person skilled in the art will readily recognize that performing object detection and tracking locally on a viewing device may be slow, resulting in a lag time in viewing the virtual objects. This may result in the end user not perceiving the virtual objects to be attached to the real-world physical object of interest. By offloading the task of object detection and object pose estimation to a remote server, the present embodiment will allow more robust object detection.

In an example embodiment, the computationally complex tasks of object detection and pose estimation are offloaded to a remote server while the local visual odometry system tracks the pose of the user. The sensor data is sent to a remote server, processed, and the identity and pose of the detected object is streamed back to the viewing device. The pose of the object with respect to the camera is tracked using a visual odometry system running locally on the viewing device. Simultaneously, the viewing device may track its own position in order to avoid any additional latency for rendering. The result is that virtual objects may be registered accurately and in real time. The time required to communicate and process the sensor data may be less than the time required if performed solely on the viewing device.

The present application describes offloading the task of object detection and pose estimation to a remote server. Simultaneously, the AR display device tracks its own position in order to avoid any additional latency for rendering. Because of the limited amount of computing resources on the AR display device, a combination of tracking and rendering processes may be offloaded to external resources, such as a network of servers.

In one example embodiment, a server receives first sensor data from a first sensor of an AR display device. The first sensor data indicates a pose of the AR display device relative to a first reference coordinate system. The server receives second sensor data from a second sensor of the AR display device. The server detects a physical object using the second sensor data and determines, based on the second sensor data, a pose of the physical object relative to the AR display device. The pose of the physical object relative to the first reference coordinate system is determined based on the pose of the physical object relative to the AR display device and the pose of the AR display device relative to the first reference coordinate system. The server streams the pose of the physical object relative to the first reference coordinate system to the AR display device.

In another example embodiment, the AR display device renders a virtual object corresponding to the physical object, and displays the virtual object in a display of the AR display device using the pose of the physical object relative to the first reference coordinate system.

In another example embodiment, the virtual object is displayed in the display of the AR display device independently from the pose of the physical object relative to the AR display device.

In another example embodiment, the server receives third sensor data from a third sensor external to the AR display device. The third sensor data indicates the pose of the AR display device relative to the first reference coordinate system. The server determines the pose of the physical object relative to the first reference coordinate system based on the pose of the physical object relative to the AR display device and, using the third sensor data, the pose of the AR display device relative to the first reference coordinate system.

In another example embodiment, the server renders a virtual object based on the pose of the physical object relative to the first reference coordinate system, and streams the rendered virtual object to the AR display device, wherein the AR display device is configured to display the rendered virtual object based on the pose of the physical object relative to the first reference coordinate system.

In another example embodiment, the server renders a virtual object based on the pose of the physical object relative to the first reference coordinate system; and streams the rendered virtual object to the AR display device, wherein the AR display device is configured to display the rendered virtual object based on the pose of the physical object relative to the first reference coordinate system.

In another example embodiment, the first sensor includes a visual odometry system configured to identify a position and an orientation of the AR display device relative to the first reference coordinate system. The second sensor includes an optical sensor configured to generate second sensor data based on an image of the physical object captured by the optical sensor.

In another example embodiment, the server receives a request from an AR display device to offload a tracking process of the AR display device to the server system. In response to receiving the request, the server generates offloaded processed data based on the first sensor data and second sensor data; and streams the offloaded processed data to the AR display device. The AR display device presents, in a display of the AR display device, virtual objects based on the offloaded processed data.

In another example embodiment, third sensor data includes externally tracked data based on a location and an orientation of the AR display device relative to a third sensor that is external to the AR display device. The offloaded processed data is based on a combination of the first, second, and third sensor data.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating an AR application of a device, according to some example embodiments. The network environment 100 includes an AR display device 101 and a server 110, communicatively coupled to each other via a network 108. The AR display device 101 and the server 110 may each be implemented in a computer system, in whole or in part, as described below with respect to FIG. 21.

The server 110 may be part of a network-based system. For example, the network-based system may be or include a cloud-based server system that provides additional information, such as three-dimensional models, to the AR display device 101.

FIG. 1 illustrates a user 102 using the AR display device 101. The user 102 may be a human user (e.g., a human being), a machine user (e.g., a computer configured by a software program to interact with the device 101), or any suitable combination thereof (e.g., a human assisted by a machine or a machine supervised by a human). The user 102 is not part of the network environment 100, but is associated with the AR display device 101 and may be a user 102 of the AR display device 101. For example, the AR display device 101 may be a computing device with a display such as a smartphone, a tablet computer, or a wearable computing device (e.g., watch or glasses). The computing device may be hand held or may be removable mounted to a head of the user 102. In one example, the display may be a screen that displays what is captured with a camera of the AR display device 101. In another example, the display of the device 102 may be transparent such as in lenses of wearable computing glasses. In other examples, the display may be a transparent display such as a windshield of a car, plane, truck. The display may be non-transparent and wearable by the user to cover the field of vision of the user.

The user 102 may be a user of an application in the AR display device 101. The application may include an AR application configured to provide the user 102 with an experience triggered by a physical object 103, such as a two-dimensional physical object (e.g., a picture), a three-dimensional physical object (e.g., a statue), a location (e.g., at lobby of a casino), or any references (e.g., perceived corners of walls or furniture) in the real-world physical environment. For example, the user 102 may point a camera of the AR display device 101 to capture an image of the physical object. The image is tracked and recognized locally in the AR display device 101 using a local context recognition dataset module of the AR application of the AR display device 101. The local context recognition dataset module may include a library of virtual objects associated with real-world physical objects or references. The AR application then generates additional information corresponding to the image (e.g., a three-dimensional model) and presents this additional information in a display of the AR display device 101 in response to identifying the recognized image. If the captured image is not recognized locally at the AR display device 101, the AR display device 101 downloads additional information (e.g., the three-dimensional model) corresponding to the captured image, from a database of the server 110 over the network 108.

In one example embodiment, the AR display device 101 may wish to offload some processes (tracking and rendering of virtual objects to be displayed in the AR display device 101) using external tracking sensors 112 and computing resources of the server 110.

The external tracking sensors 112 may be used to track the pose (e.g., location and orientation) of the AR display device 101 and the pose of the physical object 103 without using sensors that are part of the AR display device 101. The external tracking sensors 112 may include optical sensors (e.g., depth-enabled 3D camera), wireless sensors (Bluetooth, Wi-Fi), GPS sensor, and audio sensor to determine the location of the user 102 having the AR display device 101, distance of the user 102 to the external tracking sensors 112 in the physical environment (e.g., sensors placed in corners of a venue or a room), the orientation of the AR display device 101 to track what the user 102 is looking at (e.g., direction at which the AR display device 101 is pointed, AR display device 101 pointed towards the physical object 103, AR display device 101 pointed at a person in a room).

The computing resources of the server 110 may be used to detect the physical object 103 based on sensor data (e.g., optical sensor data) from the AR display device 101, receive tracking data from the AR display device 101, determine a pose of the physical object 103 based on the tracking data, generate a virtual object based on the pose of the physical object 103, and stream the pose of the virtual object back to the AR display device 101. The object recognition, tracking, and AR rendering is therefore performed on the server 110 and streamed to the AR display device 101. As such, the AR display device 101 does not have to detect the physical object or compute the pose of the virtual object corresponding to the physical object. The AR display device 101 displays the already rendered virtual object in a display of the AR display device 101.

In another embodiment, tracking data from the external tracking sensors 112 may be used tracking a pose of the physical object 103 (and/or a pose of the AR display device 101) without having to rely on tracking sensors in the AR display device 101. In another example embodiment, the external tracking sensors 112 tracks a usage of the AR display device 101. For example, analytics data may track at what the locations (e.g., points or features) on the physical or virtual object the user 102 has looked, how long the user 102 has looked at each location on the physical or virtual object, how the user 102 held the AR display device 101 when looking at the physical or virtual object, which features of the virtual object the user 102 interacted with (e.g., such as whether a user 102 tapped on a link in the virtual object), and any suitable combination thereof. The AR display device 101 receives a visualization content dataset related to the analytics data. The AR display device 101 then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 14-20. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 108 may be any network that enables communication between or among machines (e.g., server 110), databases, and devices (e.g., AR display device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Figure 2:
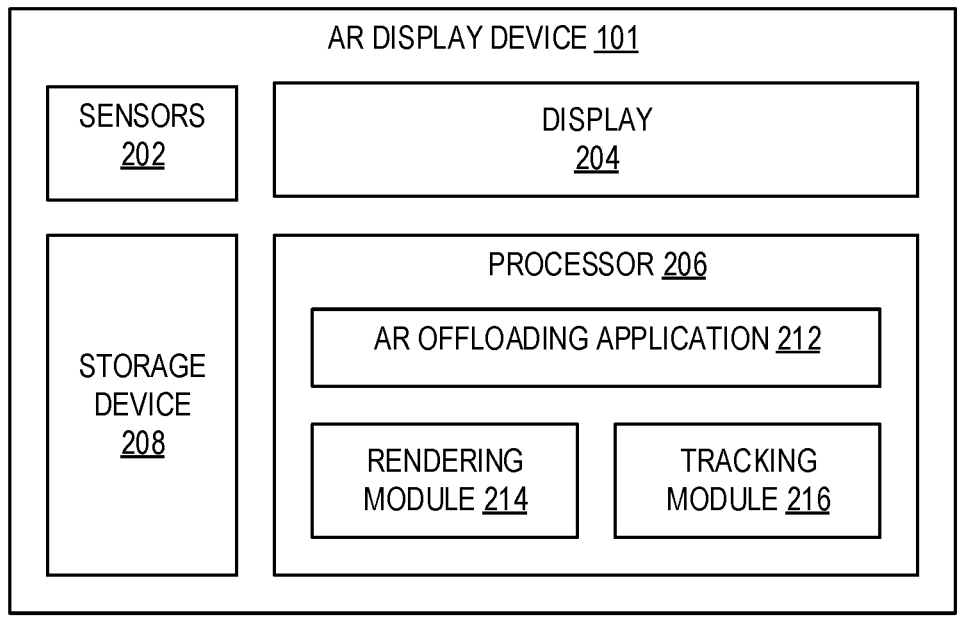
FIG. 2 is a block diagram illustrating an example embodiment of modules (e.g., components) of an augmented reality display device.

FIG. 2 is a block diagram illustrating modules (e.g., components) of the AR display device 101, according to some example embodiments. The AR display device 101 may include sensors 202, a display 204, a processor 206, and a storage device 208. For example, the AR display device 101 may be a wearable computing device, desktop computer, a vehicle computer, a tablet computer, a navigational device, a portable media device, or a smart phone of a user 102. The user 102 may be a human user (e.g., a human being), a machine user (e.g., a computer configured by a software program to interact with the AR display device 101), or any suitable combination thereof (e.g., a human assisted by a machine or a machine supervised by a human).

The sensors 202 may include, for example, a proximity or location sensor (e.g., near field communication, GPS, Bluetooth, Wifi), an optical sensor (e.g., camera such as a color camera, a thermal camera, a depth sensor and one or multiple grayscale, global shutter tracking cameras), an orientation sensor (e.g., gyroscope, accelerometer), an audio sensor (e.g., a microphone), or any suitable combination thereof. For example, the sensors 202 may include a rear-facing camera and a front-facing camera in the AR display device 101. It is noted that the sensors described herein are for illustration purposes and the sensors 202 are thus not limited to the ones described.

The display 204 may include, for example, a touchscreen display configured to receive a user input via a contact on the touchscreen display. In one example, the display 204 may include a screen or monitor configured to display images generated by the processor 206. In another example, the display 204 may be transparent or semi-opaque so that the user 102 can see through the display 204 (e.g., Head-Up Display).

The processor 206 may include an AR offloading application 212, a rendering module 214, and a tracking module 216. The AR offloading application 212 may orchestrate and determine which process (e.g., detecting an object, tracking a pose of the AR display device 101 or the object, rendering virtual object) to offload to the server 110. The rendering module 214 renders virtual objects based on objects detected by the sensors 202. The tracking module 216 generates internal tracking data of the AR display device 101 using the sensors 202 to determine a pose of the AR display device 101 relative to a frame of reference (e.g., a room).

The offloading application 212 may offload a combination of object detection, object tracking, and rendering processes to the server 110. For example, the AR offloading application 212 may offload only the rendering process to the server 110 while still providing tracking data (using the sensors internal to the AR display device 101) to the server 110. In another example, the AR offloading application 212 may offload only the object detection and tracking process to the server 110 while rendering virtual objects at the AR display device 101 using external tracking data provided to the AR display device 101. In another example, the AR offloading application 212 may offload the object detection, tracking, and rendering processes to the server 110. In another example, the AR offloading application 212 may offload a portion of the rendering process to the server 110 (e.g., the server 110 renders virtual objects A, B, and C, and the AR display device 101 renders virtual objects D, E, and F based on predefined conditions). For example, virtual objects that require more computing resources for rendering may be rendered on the server 110 while virtual objects that require less computing resources for rendering may be rendered on the AR display device 101. In another example, virtual objects located in a central area of the display 204 may be rendered on the AR display device 101, while virtual objects location in a peripheral area of the display 204 may be rendered on the server 110 and streamed back to the AR display device 101. In another example, the AR offloading application 212 may adjust a visualization of the virtual objects based on updated tracking data from the sensors 202. For example, the AR display device 101 is pointed at a chair. When the AR display device 101 receives the rendered virtual object from the server 110, the chair has moved. The AR offloading application 212 may then adjust a position of the rendered virtual object in the display 204 based on the last tracked position of the chair. Similarly, the AR offloading application 212 may adjust a visualization of the virtual objects based on updated tracking data such as reference points (e.g., edges of an object, corners of a room) detected by sensors 202 and tracking sensors 112.

The rendering module 214 includes a local rendering engine that generates a visualization of a three-dimensional virtual object overlaid on (e.g., superimposed upon, or otherwise displayed in tandem with) an image of a physical object captured by a camera of the AR display device 101 in the display 204 of the AR display device 101. A visualization of the three-dimensional virtual object may be manipulated by adjusting a position of the physical object (e.g., its physical location, orientation, or both) relative to the camera of the AR display device 101. Similarly, the visualization of the three-dimensional virtual object may be manipulated by adjusting a position camera of the AR display device 101 relative to the physical object.

In one example embodiment, the rendering module 214 may retrieve three-dimensional models of virtual objects associated with a real-world physical object captured using the tracking module 216. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object).

In one example embodiment, the rendering module 214 may include a manipulation module that identifies the physical object (e.g., a physical telephone), accesses virtual functions (e.g., increase or lower the volume of a nearby television) associated with physical manipulations (e.g., lifting a physical telephone handset) of the physical object, and generates a virtual function corresponding to a physical manipulation of the physical object.

In another example embodiment, the AR display device 101 includes a contextual local image recognition module (not shown) configured to determine whether the captured image matches an image locally stored in a local database of images and corresponding additional information (e.g., three-dimensional model and interactive features) on the AR display device 101. In one embodiment, the contextual local image recognition module retrieves a primary content dataset from the server 110, and generates and updates a contextual content dataset based on an image captured with the AR display device 101.

The storage device 208 may be configured to store a database of visual references (e.g., images) and corresponding experiences (e.g., three-dimensional virtual objects, interactive features of the three-dimensional virtual objects). For example, the visual reference may include a machine-readable code or a previously identified image (e.g., a picture of shoe). The previously identified image of the shoe may correspond to a three-dimensional virtual model of the shoe that can be viewed from different angles by manipulating the position of the AR display device 101 relative to the picture of the shoe. Features of the three-dimensional virtual shoe may include selectable icons on the three-dimensional virtual model of the shoe. An icon may be selected or activated by tapping or moving on the AR display device 101.

In one example embodiment, the storage device 208 includes a primary content dataset, a contextual content dataset, and a visualization content dataset. The primary content dataset includes, for example, a first set of images and corresponding experiences (e.g., interaction with three-dimensional virtual object models). For example, an image may be associated with one or more virtual object models. The primary content dataset may include a core set of images of the most popular images determined by the server 110. The core set of images may include a limited number of images identified by the server 110. For example, the core set of images may include the images depicting covers of the ten most popular magazines and their corresponding experiences (e.g., virtual objects that represent the ten most popular magazines). In another example, the server 110 may generate the first set of images based on the most popular or often scanned images received at the server 110. Thus, the primary content dataset does not depend on objects or images scanned by the rendering module 214 of the AR display device 101.

The contextual content dataset includes, for example, a second set of images and corresponding experiences (e.g., three-dimensional virtual object models) retrieved from the server 110. For example, images captured with the AR display device 101 that are not recognized (e.g., by the server 110) in the primary content dataset are submitted to the server 110 for recognition. If the captured image is recognized by the server 110, a corresponding experience may be downloaded at the AR display device 101 and stored in the contextual content dataset. Thus, the contextual content dataset relies on the context in which the AR display device 101 has been used. As such, the contextual content dataset depends on objects or images scanned by the rendering module 214 of the AR display device 101.

In one example embodiment, the AR display device 101 may communicate over the network 108 with the server 110 to retrieve a portion of a database of visual references, corresponding three-dimensional virtual objects, and corresponding interactive features of the three-dimensional virtual objects. The network 108 may be any network that enables communication between or among machines, databases, and devices (e.g., the AR display device 101). Accordingly, the network 108 may be a wired network, a wireless network (e.g., a mobile or cellular network), or any suitable combination thereof. The network 108 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
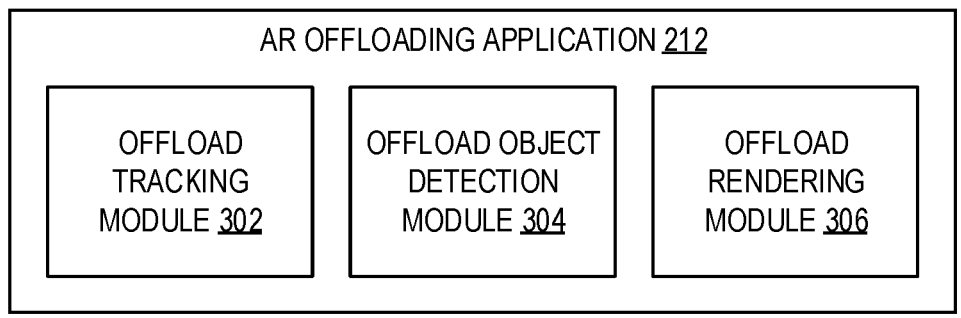
FIG. 3 is a block diagram illustrating an example embodiment of modules (e.g., components) of an augmented reality offloading application.

FIG. 3 is a block diagram illustrating modules (e.g., components) of the AR offloading application 212 of FIG. 2. The AR offloading application 212 may include an offload tracking module 302, an offload object detection module 304, and an offload rendering module 306.

The offload tracking module 302 may be used to offload only the tracking process to the server 110 while rendering virtual objects at the AR display device 101 using external tracking data provided to the AR display device 101. For example, the offload tracking module 304 may request the server 110 to track the location and position of the AR display device 101 using sensors external to the AR display device 101. The server 110 receives tracking data related to the AR display device 101 using sensors external to the AR display device 101. The server 110 communicates the external tracking data to the AR display device 101. The AR display device 101 renders a virtual object based on the external tracking data provided by the server 110. As such, the AR display device 101 does not have to use or enable its tracking sensors. In another example, the external tracking data may be compared with the AR display device 101 to calibrate the external tracking sensors 112 external to the AR display device 101. In another example, the external tracking data may be used to augment internal tracking data generated by the AR display device 101 for further accuracy. An example scenario of using the offload tracking module 302 includes a customer walking into a lobby of a retail store. Sensors placed throughout the retail store may detect the precise location of the customer and the orientation of a AR display device 101 of the customer to determine items that the customer is looking at. For example, the external tracking data may show that the customer is at the frozen food section and is looking down the dessert aisle, and the AR display device 101 may display a virtual ad or coupon related to a specific dessert.

The offload object detection module 304 may be used to offload detection of an object depicted in an image captured by the sensors 202 to the server 110. Sensor data from the image sensors are sent to the server 110 for processing (e.g., object recognition). Both object detection and pose of the detected object are performed at the server 110. The AR display device 101 acts as a streaming device to receive the pose of the detected object (relative to the same frame of reference used for tracking the pose of the AR display device 101). The AR display device 101 renders and displays a virtual object based on the pose of the detected object in the display 204.

The offload rendering module 306 may be used to offload only the rendering process to the server 110 while still providing tracking data (using the sensors internal or external to the AR display device 101) to the server 110. For example, the offload rendering module 306 may send sensor data to the server 110. The server 110 determines which virtual object or information to render based on the sensor data provided by the AR display device 101. The server 110 renders the virtual object and sends the rendered virtual object to the AR display device 101. As such, the AR display device 101 does not have to use computing resources to render any virtual object.

In one example, the AR offloading application 212 may offload a portion of the rendering process to the server 110 (e.g., the server 110 renders virtual objects A, B, and C, and the AR display device 101 renders virtual objects D, E, and F based on predefined conditions). For example, virtual objects that require more computing resources for rendering may be rendered on the server 110, while virtual objects that require less computing resources for rendering may be rendered on the AR display device 101. In another example, virtual objects located in a central area of the display 204 may be rendered on the AR display device 101, while virtual objects location in a peripheral area of the display 204 may be rendered on the server 110 and streamed back to the AR display device 101.

In another example, the AR offloading application 212 may adjust a visualization of the virtual objects based on an updated tracking data from the sensors 202. For example, the AR display device 101 is pointed at a chair. When the AR display device 101 receives the rendered virtual object from the server 110, the chair has moved. The AR offloading application 212 may then adjust a position of the rendered virtual object in the display 204 based on the last tracked position of the chair.

Figure 4:
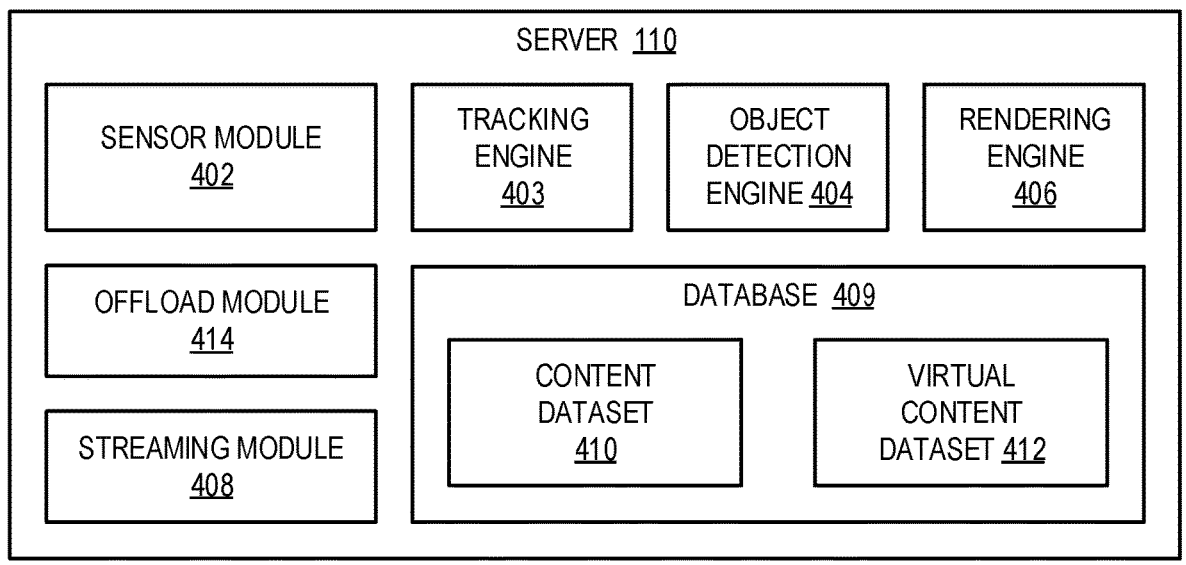
FIG. 4 is a block diagram illustrating an example embodiment of a server.

FIG. 4 is a block diagram illustrating modules (e.g., components) of the server 110. The server 110 includes a sensor module 402, a tracking engine 403, an object detection engine 404, a rendering engine 406, an offload module 414, a streaming module 408, and a database 409.

The sensor module 402 interfaces and communicates with sensors 202 to obtain sensor data related to a pose (e.g., geographic location and orientation) of the AR display device 101 relative to a first frame of reference (e.g., the room or real-world coordinates) and to one or more objects detected by the image sensors of the external tracking sensors 112. In another example embodiment, the sensor module 402 communicates with external tracking sensors 112 and obtains external sensor data related to a pose of the physical object 103 detected by the external tracking sensors 112.

The tracking engine 403 generates tracking data based on the data collected from the sensor module 402 and the sensors 112. In one embodiment, the tracking engine 403 identifies a pose of the AR display device 101 based on the tracking data. In another example embodiment, the tracking engine 403 identifies a pose of an object detected by the external tracking sensors 112 and the sensors 202. Furthermore, the tracking engine 403 converts coordinates of the pose of the physical object 103 from a first frame of reference (e.g., coordinates relative to the AR display device 101) to a second frame of reference (e.g., relative to a room or world coordinates) based on the sensor data. An example of the different frames of references is illustrated in FIG. 23.

Figure 23:
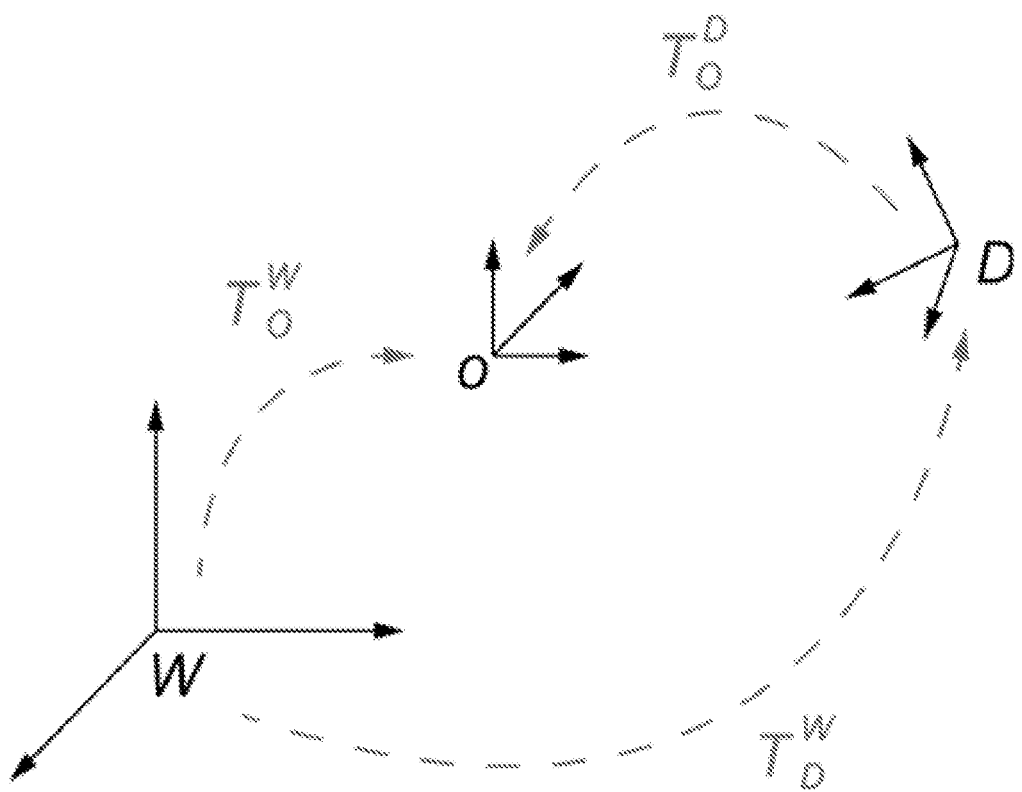
FIG. 23 is diagram illustrating coordinates references between an augmented reality display device and a physical object.

FIG. 23 illustrates how the pose ($T^W_D$) of the AR display device 101 (D) in the world coordinate system (W) is tracked by the visual odometry system on the AR display device 101. In order to detect an object (O), the AR display device 101's sensor output is sent to the server 110 together with the current pose ($T^W_D$) of the AR display device 101 in the world. Based on the sensor data, the server 110 determines the pose ($T^D_O$) of the object in the AR display device 101's coordinate system. This result is applied to the previously saved world pose of the AR display device 101 ($T^W_D$) in order to get the desired pose ($T^W_O$) of the object in the world coordinate system. This method allows the AR display device 101 to keep tracking its pose in the world while the server 110 independently computes the pose of the object in the world.

When AR display device 101 (D) is started, the visual odometry system establishes a world coordinate system (W). The AR display device 101 subsequently tracks the position of the user within this coordinate system, resulting in a Pose ($T^W_D$) of the AR display device 101 in the world coordinate system. Whenever a real-world physical object (O) should be detected, the current pose ($T^W_D$) of the AR display device 101 within the world coordinate system together with the output of the external tracking sensors 112 (or sensors internal to the AR display device 101) are sent to the server 110. The server 110 then uses the data from the sensors 112 to detect objects in the view of these sensors 112 and estimate the pose ($T^D_O$) of the detected object relative to the AR display device 101's coordinate system. The final pose ($T^W_D$) of the detected object in the world coordinate system can be computed by applying the pose ($T^W_D$) of the AR display device 101 in the world coordinate system, which was measured at the time when the sensors' 112 data was recorded, to the pose ($T^D_O$) of the object within the AR display device 101's coordinate system as seen in FIG. 1.

The visual odometry system continuously tracks the pose of the AR display device 101 in the world coordinate system, and the server 110 returns the resulting pose of the detected real-world physical object in the world coordinate system. The detected real-world physical object can be placed correctly in the scene no matter how far the user has moved from the first time the data was sent to the time the result returned. Therefore, the actual task of computing the pose of an object does not impact the performance of the viewing device 101. In addition, the final result always is correctly placed within the world coordinate system, independent of the time it takes the server to return the result. Hence, no additional latency is added during pose computation since the actual rendering of the displayed information only depends on the pose of the device within the world coordinate system, which is computed on the device itself.

Back to FIG. 4, the object detection engine 404 communicates with the sensor module 402 and accesses sensor data from the sensors 202. The object detection engine 404 analyzes the sensor data to identify and recognize the physical object 103 depicted in an image generated by the sensors 202. For example, the object detection engine 404 includes an object recognition engine (not shown) that helps identify the physical object 103. In another example embodiment, the object detection engine 404 determines or generates a virtual object based on the detected physical object 103.

The rendering engine 406 may generate a model of a virtual object to be rendered in the display 204 of the AR display device 101 based on the pose of the AR display device 101 and the pose of the physical object 103. A physical movement of the physical object 103 is identified from an image captured by the AR display device 101. The rendering engine 406 may also determine a virtual object corresponding to the tracking data (either received from the AR display device 101 or generated externally to the AR display device 101) and render the virtual object. Furthermore, the tracking data may identify a real-world object being looked at by the AR display device 101. The virtual object may include a manipulable virtual object or displayed augmented information associated with the physical object 103.

The offload module 414 may receive instructions from the AR display device 101 to offload a combination of the object detection, the tracking process, and the rendering process. In response, the offload module 414 generates commands to the corresponding engines 403, 404 and 406 based on the instructions.

The streaming module 408 communicates the pose of the physical object 103 relative to real-world coordinates back to the AR display device 101 such that the AR display device 101 does not have to track the physical object 103 relative to the AR display device 101. In one example embodiment, the streaming module 408 streams the virtual object and the pose of the virtual object relative to the real-world coordinates back to the AR display device 101. In another example embodiment, the streaming module 408 streams a portion of the rendered virtual object and lets the AR display device 101 render the remaining portions of the virtual object that are not rendered or sent by the server 110.

The database 409 may store a content dataset 410 and a virtual content dataset 412. The content dataset 410 may store a primary content dataset and a contextual content dataset. The primary content dataset comprises a first set of images and corresponding virtual object models. The tracking engine 403 determines that a captured image received from the AR display device 101 is not recognized in the content dataset 410, and generates the contextual content dataset for the AR display device 101. The contextual content dataset may include a second set of images and corresponding virtual object models. The virtual content dataset 412 includes models of virtual objects to be generated upon receiving a notification associated with an image of a corresponding physical object.

Figure 5:
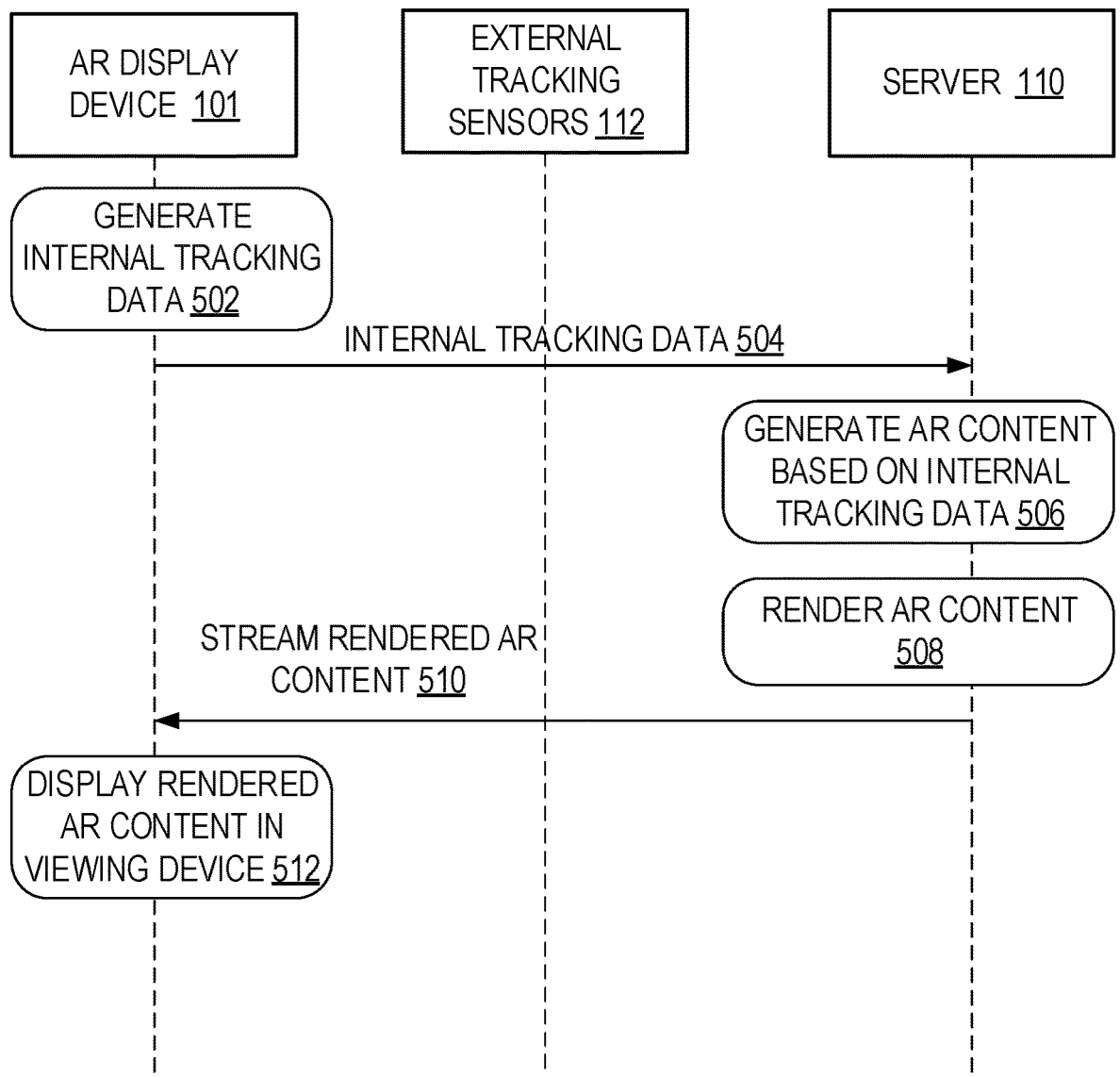
FIG. 5 is a ladder diagram illustrating an example embodiment of offloading rendering at a server.

FIG. 5 is a ladder diagram illustrating an example embodiment of offloading rendering at a server. An AR display device 101 generates internal tracking data using its own sensors 202 at operation 502. At operation 504, the AR display device 101 sends the internal tracking data and a request to offload a rendering process to the server 110. At operation 506, the server 110 generates AR content based on the received internal tracking data from the AR display device 101. At operation 508, the server 110 renders the AR content. At operation 510, the server 110 streams back the rendered AR content to the AR display device 101. At operation 512, the AR display device 101 displays the rendered AR content.

Figure 6:
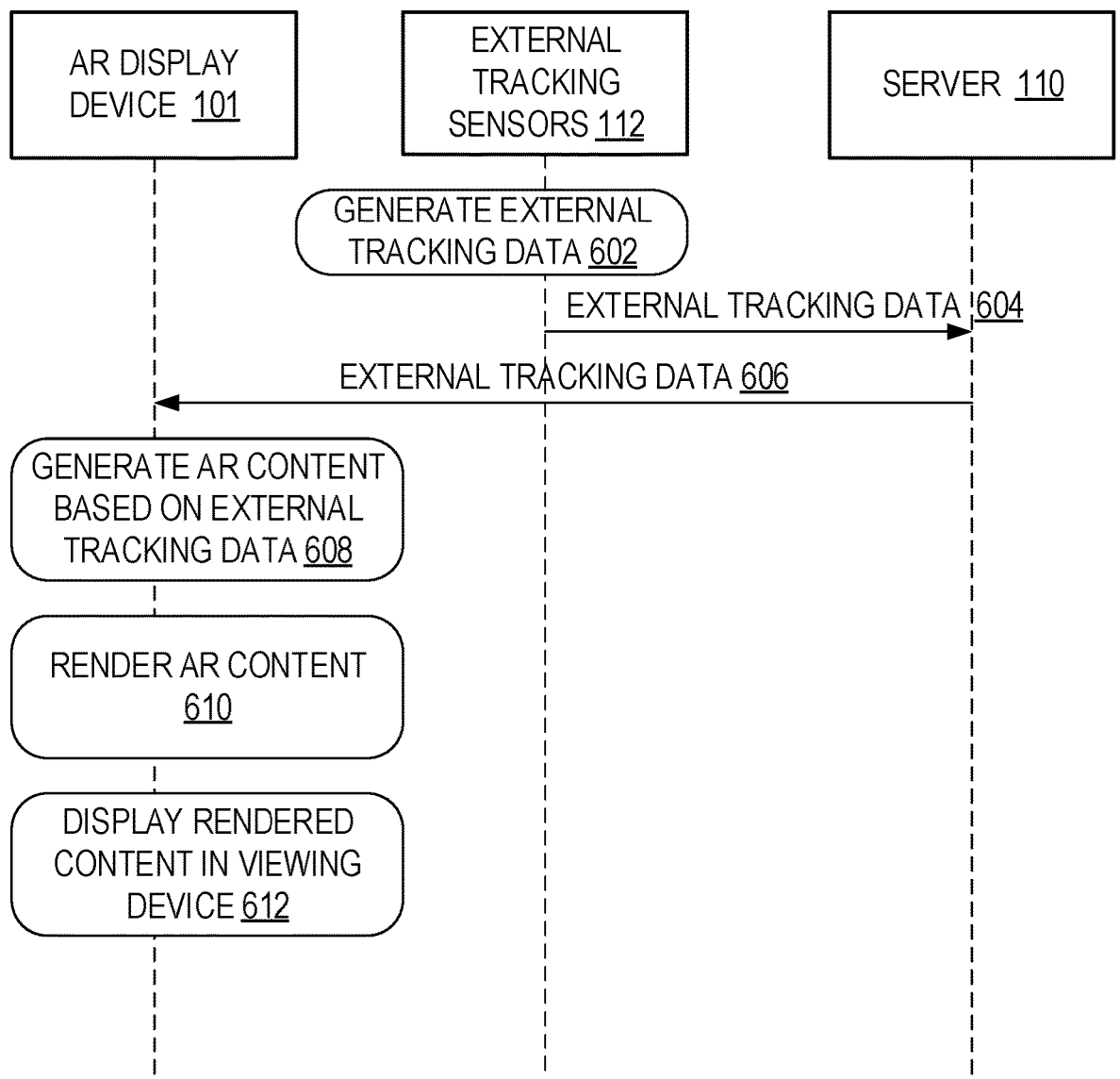
FIG. 6 is a ladder diagram illustrating an example embodiment of offloading tracking at a server.

FIG. 6 is a ladder diagram illustrating an example embodiment of offloading tracking at a server. Tracking sensors 112, which are external to the AR display device 101, generate external tracking data at operation 602. At operation 604 the external tracking sensors 112 send the external tracking data to the server 110. At operation 606, the server 110 communicates the external tracking data to the AR display device 101. At operation 608, the AR display device 101 generates AR content based on the external tracking data. At operation 610, the AR display device 101 renders the AR content. At operation 612, the AR display device 101 displays the rendered content in the display 204 of the AR display device 101.

Figure 7:
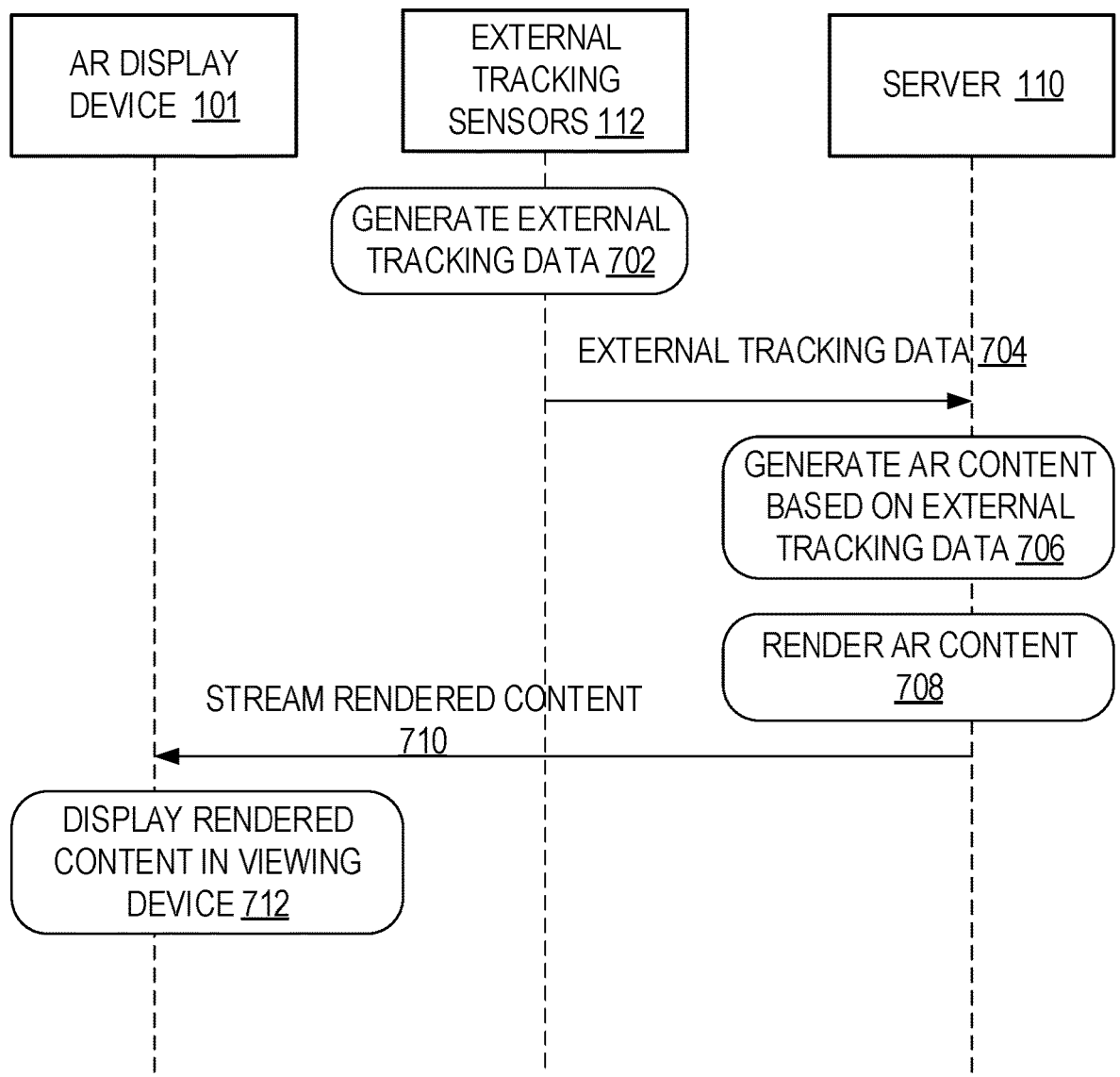
FIG. 7 is a ladder diagram illustrating an example embodiment of offloading tracking and rendering at a server.

FIG. 7 is a ladder diagram illustrating an example embodiment of offloading tracking and rendering at a server. At operation 702, external tracking sensors 112, which are external to the AR display device 101, generate external tracking data. The external tracking sensors 112 communicate the external tracking data to the server 110 at operation 704. At operation 706, the server 110 generates AR content based on the external tracking data received at operation 704. At operation 708, the server 110 renders the generated AR content based on the external tracking data. At operation 710, the server 110 streams the rendered AR content back to the AR display device 101. At operation 712, the AR display device 101 displays the rendered content.

Figure 8:
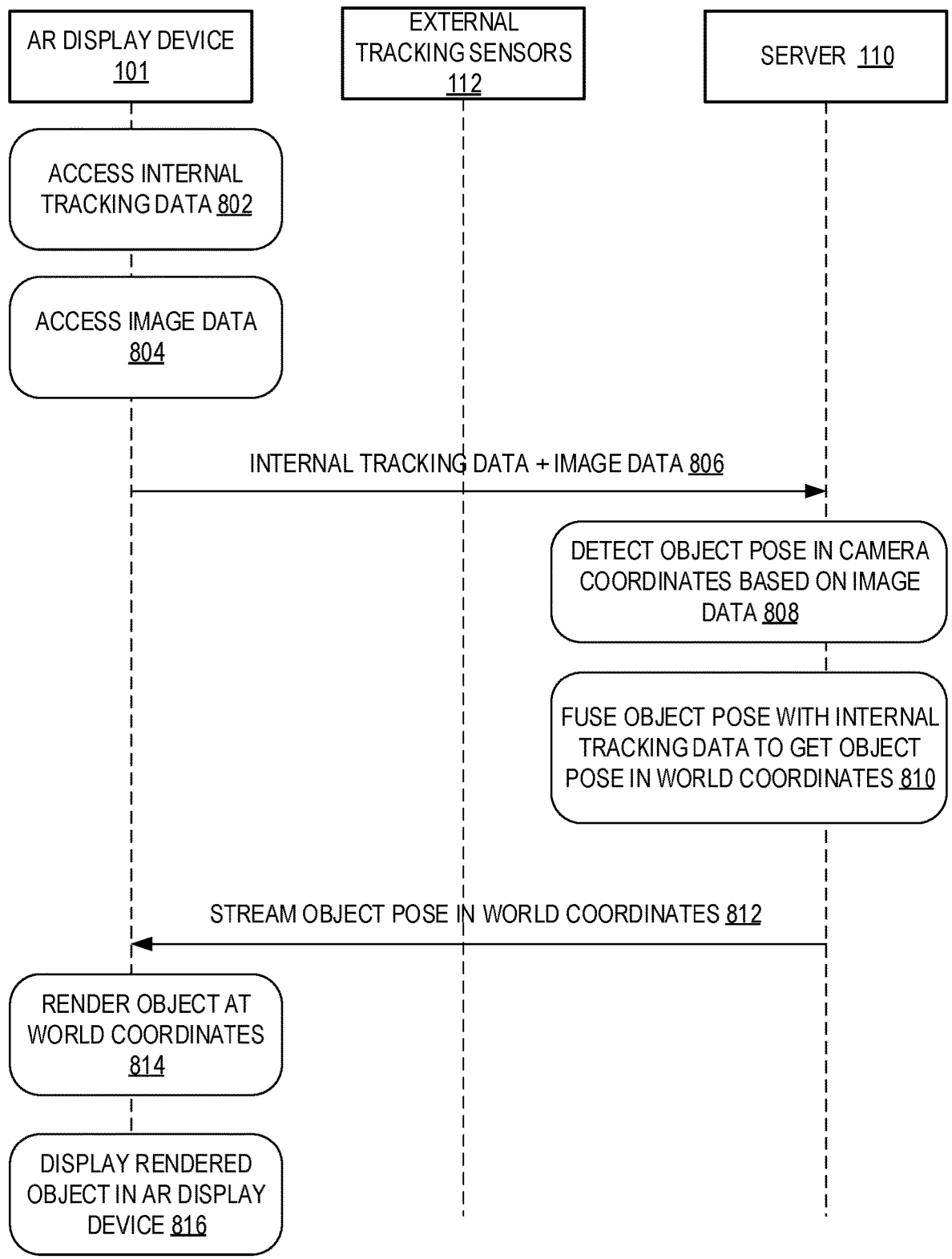
FIG. 8 is a ladder diagram illustrating an example embodiment of offloading tracking and object pose detection at a server.

FIG. 8 is a ladder diagram illustrating an example embodiment of offloading object detection at a server. An AR display device 101 generates internal tracking data using its sensors 202 at operation 802. At operation 804, the AR display device 101 also accesses image data from its sensors 202. At operation 806, the AR display device 101 sends the internal tracking data along with the image data to the server 110. At operation 808, the server 110 detects a pose of the physical object 103 (using coordinates relative to the AR display device 101) based on the image data. At operation 810, the server 110 fuses the pose of the physical object 103 with the internal tracking data of the AR display device 101 to obtain a pose of the physical object 103 in real-world coordinates. At operation 812, the server 110 streams back the pose of the physical object 103 in the real-world coordinates to the AR display device 101. At operation 814, the AR display device 101 renders a virtual object corresponding to the detected physical object 103. At operation 816, the AR display device 101 displays the virtual object based on the real-world coordinates.

Figure 9:
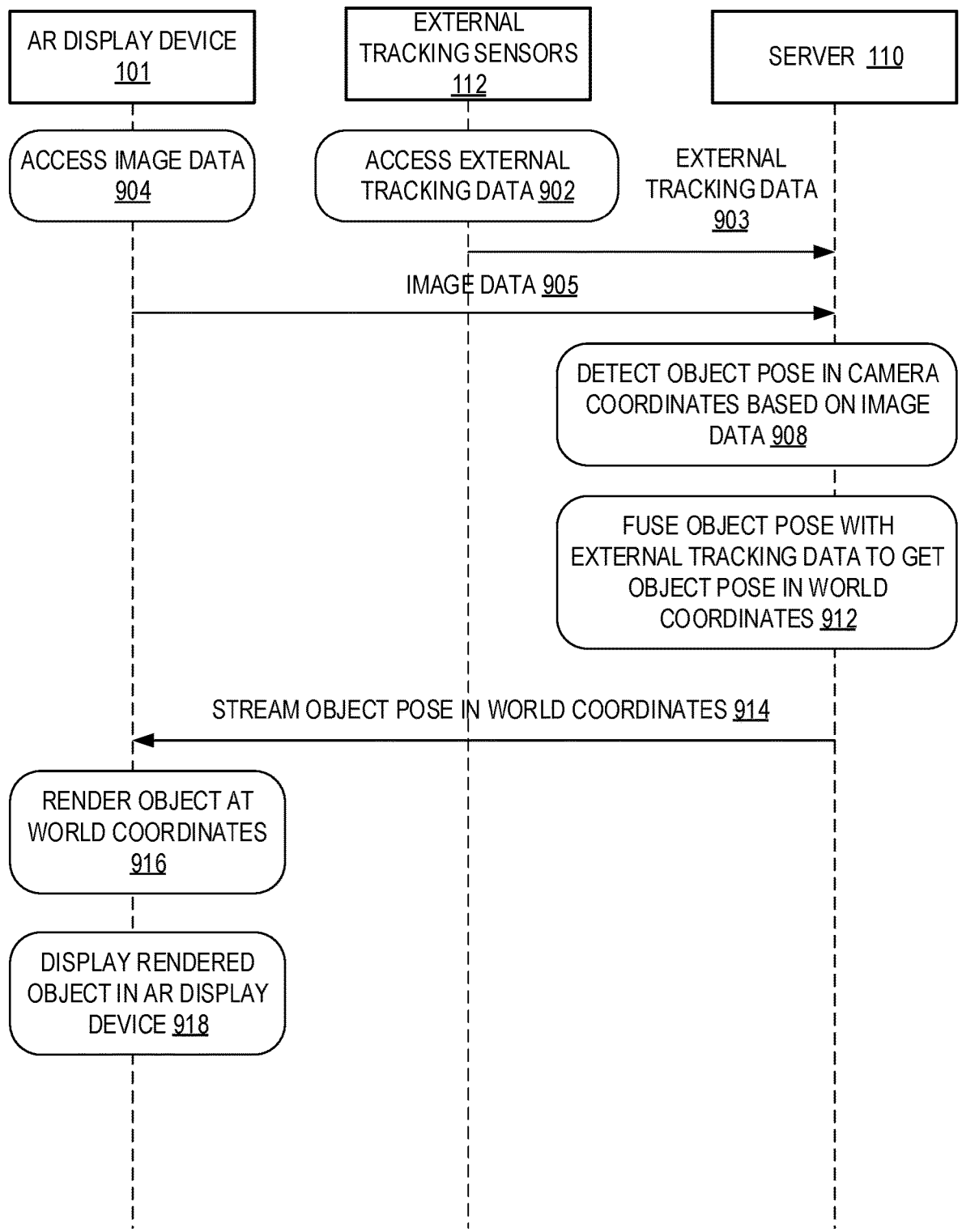
FIG. 9 is a ladder diagram illustrating another example embodiment of offloading tracking and object pose detection at a server.

FIG. 9 is a ladder diagram illustrating an example embodiment of offloading object detection at a server. External tracking sensors 112 are used to track the pose of the physical object 103 and the pose of the AR display device 101 in the world. This external data is then used by the server 110 to again determine the pose of the physical object 103 in the world. At operation 902, the external tracking sensors 112 access external tracking data. At operation 903, the external tracking sensors 112 send the external tracking data to the server 110. At operation 904, the AR display device 101 accesses image data using its sensors 202. At operation 905, the AR display device 101 sends the image data to the server 110. At operation 908, the server 110 detects a pose of the physical object 103 (using coordinates relative to the AR display device 101) based on the image data and the external tracking data. At operation 912, the server 110 fuses the pose of the physical object 103 with the external tracking data to obtain a pose of the physical object 103 in real-world coordinates. At operation 914, the server 110 streams back the pose of the physical object 103 in the real-world coordinates to the AR display device 101. At operation 916, the AR display device 101 renders a virtual object corresponding to the detected physical object 103. At operation 918, the AR display device 101 displays the virtual object using the real-world coordinates.

Figure 10:
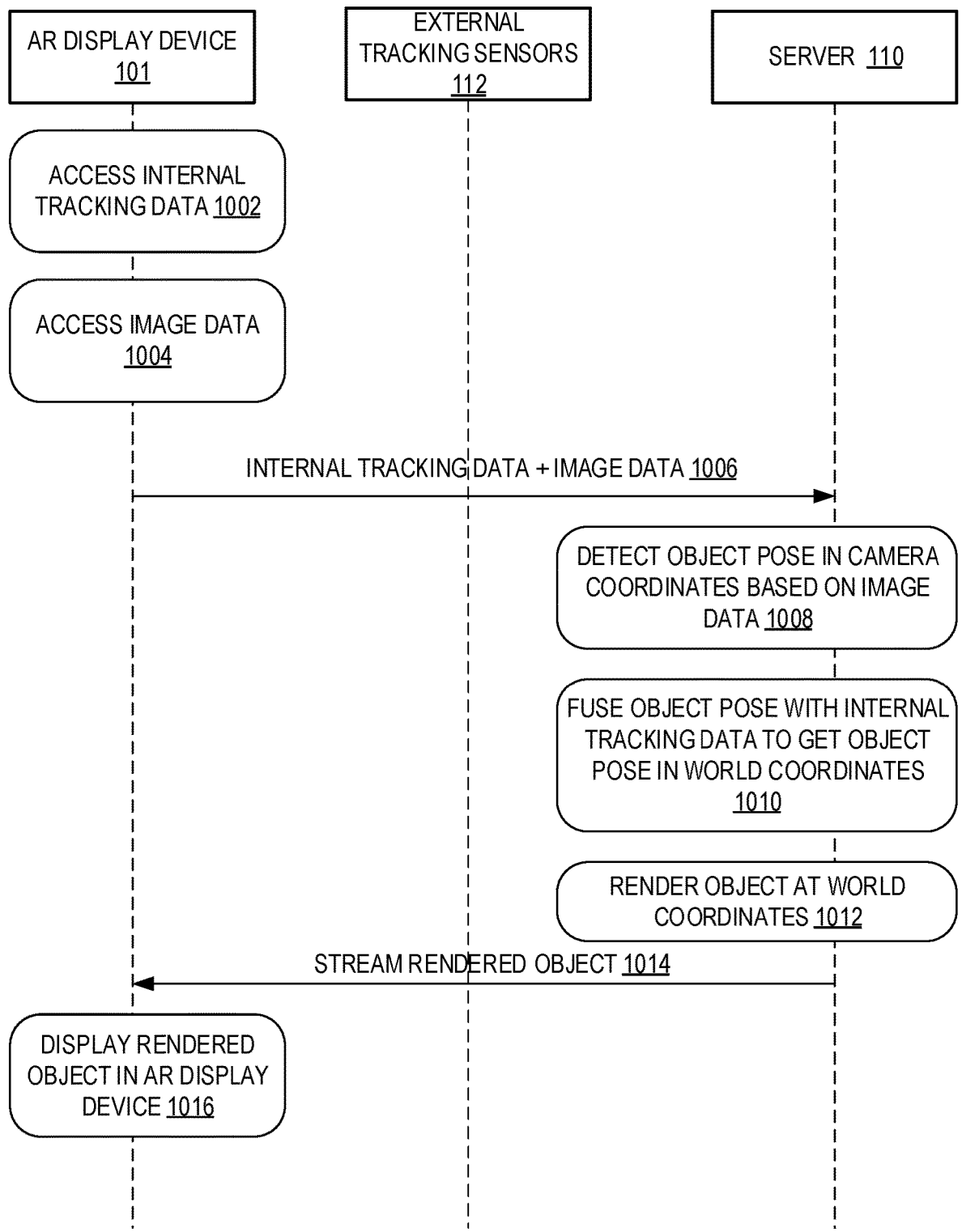
FIG. 10 is a ladder diagram illustrating an example embodiment of offloading tracking and rendering at a server.

FIG. 10 is a ladder diagram illustrating another example embodiment. An AR display device 101 generates internal tracking data using its sensors 202 at operation 1002. At operation 1004, the AR display device 101 also accesses image data from its sensors 202. At operation 1006, the AR display device 101 sends the internal tracking data along with the image data to the server 110. At operation 1008, the server 110 detects a pose of the physical object 103 (using coordinates relative to the AR display device 101) based on the image data. At operation 1010, the server 110 fuses the pose of the physical object 103 with the internal tracking data of the AR display device 101 to obtain a pose of the physical object 103 in real-world coordinates. At operation 1012, the server renders a virtual object corresponding to the physical object 103. At operation 1014, the server 110 streams the rendered object 1014 in the real-world coordinates to the AR display device 101. At operation 1016, the AR display device 101 displays the rendered virtual object based on the real-world coordinates. In this example, the AR display device 101 is only used for collecting tracking and sensor data and for displaying the final image.

Figure 11:
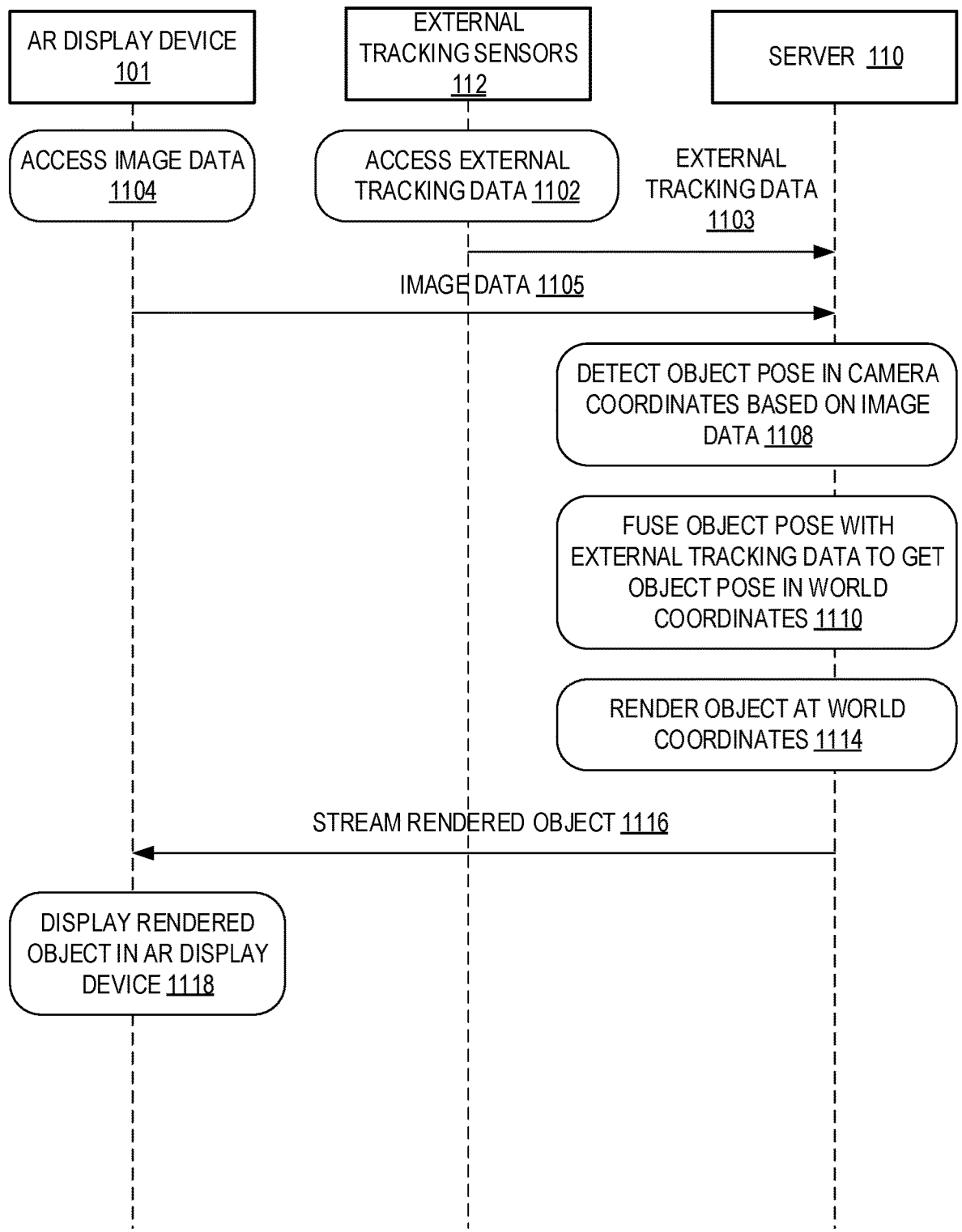
FIG. 11 is a ladder diagram illustrating another example embodiment of offloading rendering at a server.

FIG. 11 is a ladder diagram illustrating an example embodiment of offloading object detection at a server. External tracking sensors 112 are used to track the pose of the physical object 103 and the pose of the AR display device 101 in the world. This external data is then used by the server 110 to again determine the pose of the physical object 103 in the world. At operation 1102, the external tracking sensors 112 access external tracking data. At operation 1103, the external tracking sensors 112 send the external tracking data to the server 110. At operation 1104, the AR display device 101 accesses image data using its sensors 202. At operation 1105, the AR display device 101 sends the image data to the server 110. At operation 1108, the server 110 detects a pose of the physical object 103 (using coordinates relative to the AR display device 101) based on the image data and the external tracking data. At operation 1110, the server 110 fuses the pose of the physical object 103 with the external tracking data to obtain a pose of the physical object 103 in real-world coordinates. At operation 1114, the server 110 renders a virtual object corresponding to the physical object 103. At operation 1116, the server 110 streams back the rendered virtual object to the AR display device 101. At operation 1118, the AR display device 101 displays the virtual object using the real-world coordinates.

Figure 12:
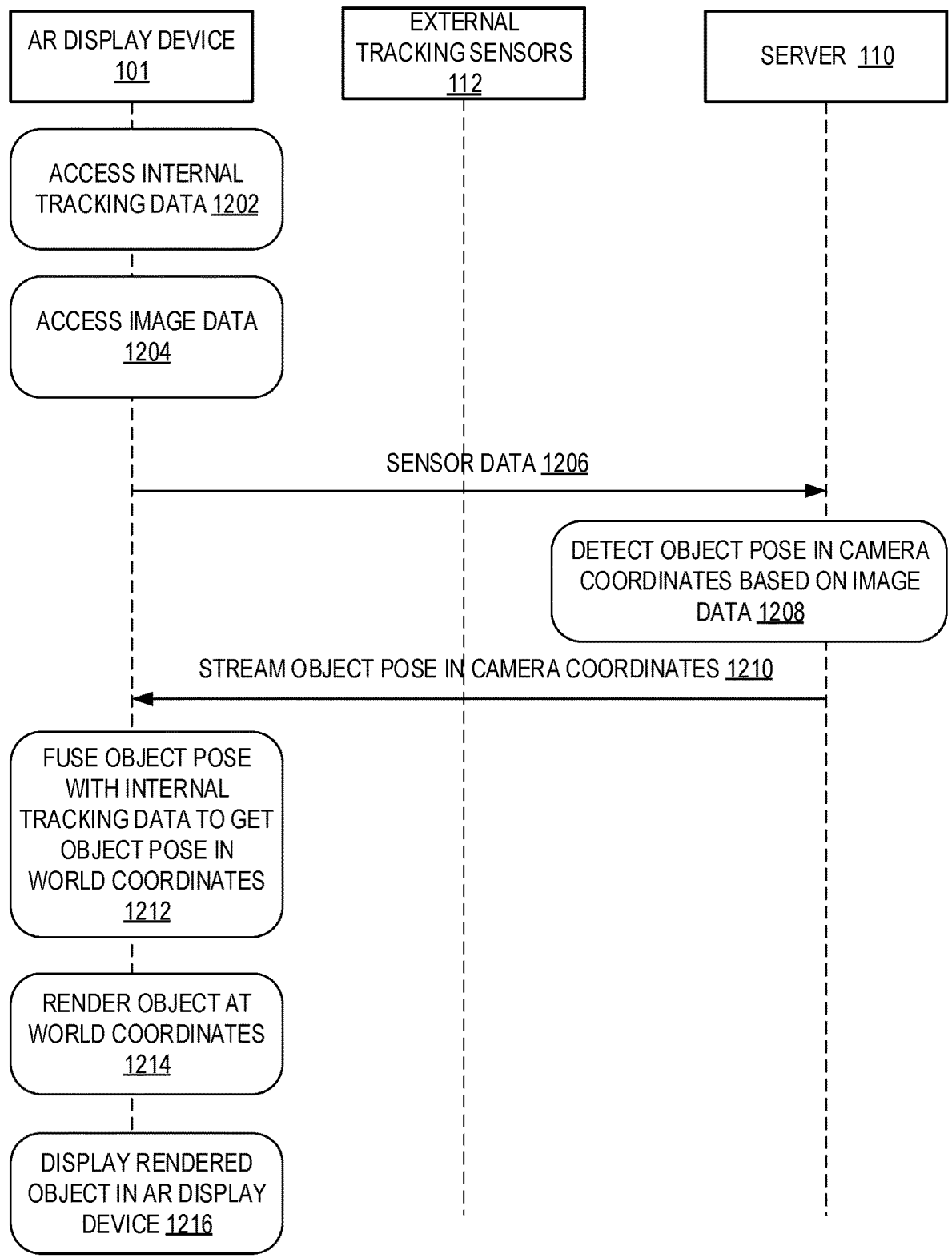
FIG. 12 is a ladder diagram illustrating an example embodiment of offloading tracking at a server.

FIG. 12 is a ladder diagram illustrating an example embodiment of offloading object detection at a server. The AR display device 101 generates internal tracking data using its sensors 202 at operation 1202. At operation 1204, the AR display device 101 also accesses image data from its sensors 202. At operation 1206, the AR display device 101 sends its image data to the server 110. At operation 1208, the server 110 detects a pose of the physical object 103 (using coordinates relative to the AR display device 101) based on the image data. At operation 1210, the server 110 streams the physical object pose (using the coordinates relative to the AR display device 101) to the AR display device 101. At operation 1212, the AR display device 101 fuses the pose of the physical object 103 with the internal tracking data of the AR display device 101 to obtain a pose of the physical object 103 in real-world coordinates. At operation 1214, the AR display device 101 renders a virtual object corresponding to the detected physical object 103 in real-world coordinates. At operation 1216, the AR display device 101 displays the virtual object based on the real-world coordinates.

Figure 13:
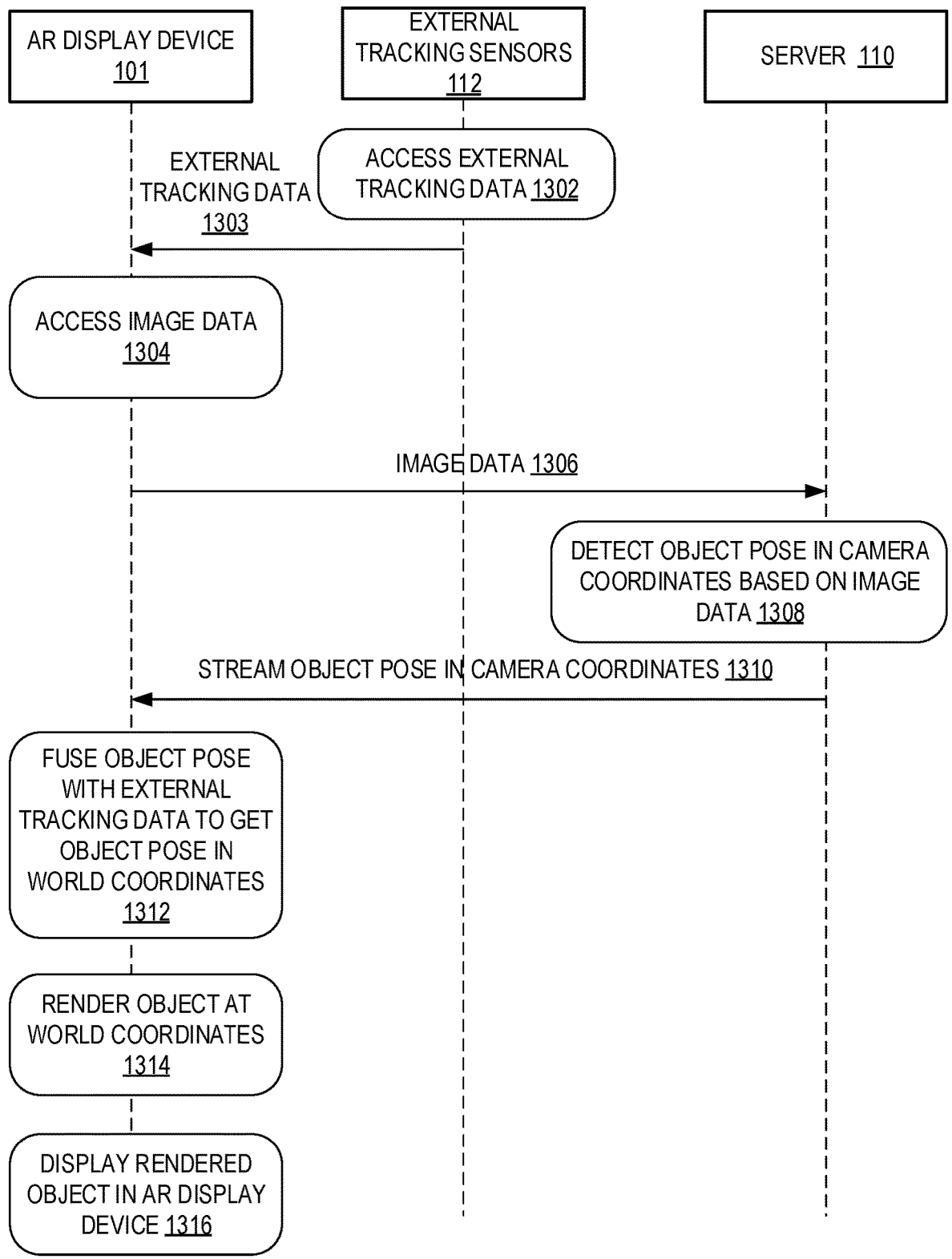
FIG. 13 is a ladder diagram illustrating an example embodiment of offloading tracking at a server.

FIG. 13 is a ladder diagram illustrating an example embodiment of offloading object detection at a server. The external tracking sensors 112 generate external tracking data at operation 1302. At operation 1303, the AR display device 101 receives the external tracking data from the external tracking sensors 112. At operation 1304, the AR display device 101 accesses its image data. At operation 1306, the AR display device 101 sends the image data to the server 110. At operation 1308, the server 110 detects a pose of the physical object 103 (using coordinates relative to the AR display device 101) based on the image data. At operation 1310, the server 110 streams the physical object pose (using the coordinates relative to the AR display device 101) to the AR display device 101. At operation 1312, the AR display device 101 fuses the pose of the physical object 103 with the external tracking data to obtain a pose of the physical object 103 in real-world coordinates. At operation 1314, the AR display device 101 renders a virtual object corresponding to the detected physical object 103 in real-world coordinates. At operation 1316, the AR display device 101 displays the virtual object based on the real-world coordinates.

Figure 14:
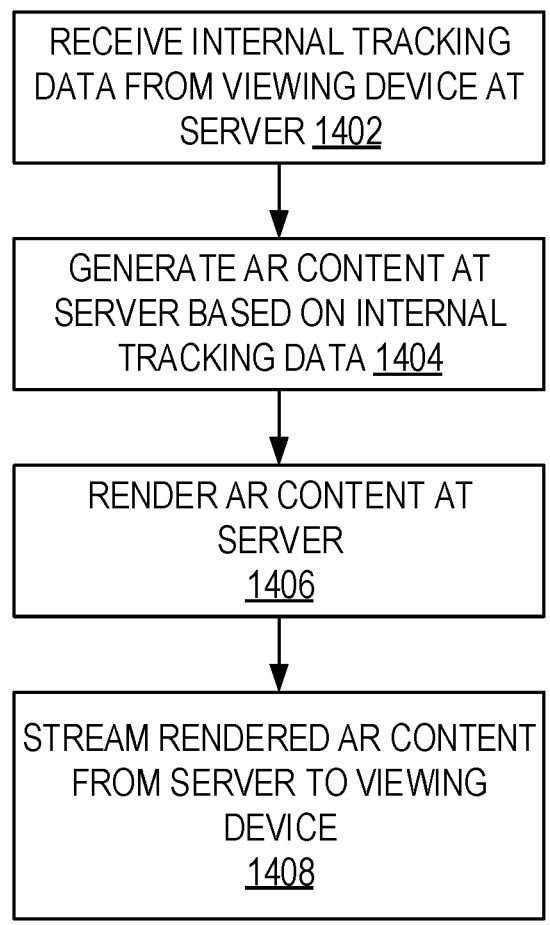
FIG. 14 is a flowchart illustrating an example operation of offloading rendering at a server.

FIG. 14 is a flowchart illustrating an example operation for offloading rendering at a server. At operation 1402, internal tracking data is received from an AR display device 101 at a server 110. At operation 1404, AR content is identified and generated at the server 110 based on the internal tracking data. At operation 1406, AR content is rendered at the server 110. At operation 1408, and AR content is streamed from the server 110 to the AR display device 101.

Figure 15:
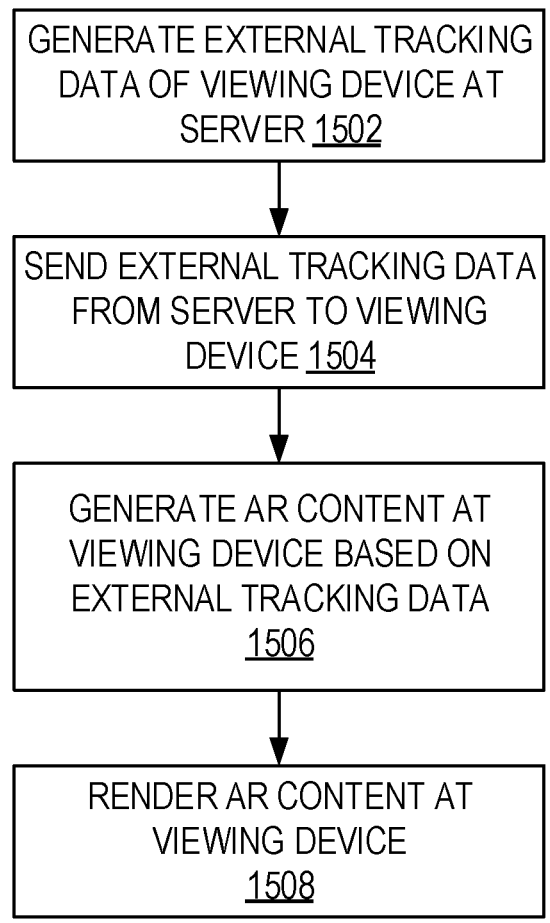
FIG. 15 is a flowchart illustrating an example operation of offloading tracking at a server.

FIG. 15 is a flowchart illustrating an example operation of offloading tracking at a server 110. At operation 1502, external tracking data related to an AR display device 101 are generated at a server 110. At operation 1504, the external tracking data is sent from the server 110 to the AR display device 101. At operation 1506, AR content is generated at the AR display device 101 based on the external tracking data. At operation 1508, AR content is rendered at the AR display device 101.

Figure 16:
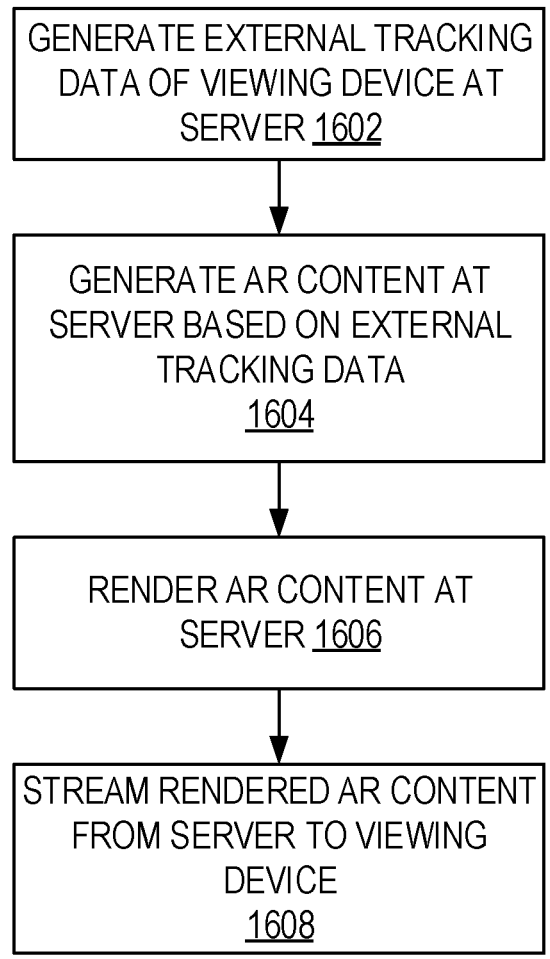
FIG. 16 is a flowchart illustrating an example operation of offloading tracking and rendering at a server.

FIG. 16 is a flowchart illustrating an example operation of offloading tracking and rendering at a server 110. At operation 1602, external tracking data related to a AR display device 101 is generated at a server 110. At operation 1604, AR content is generated at the server 110 based on the external tracking data. At operation 1606, AR content is rendered at the server 110. At operation 1608, the rendered AR content is streamed from the server 110 back to the AR display device 101.

Figure 17:
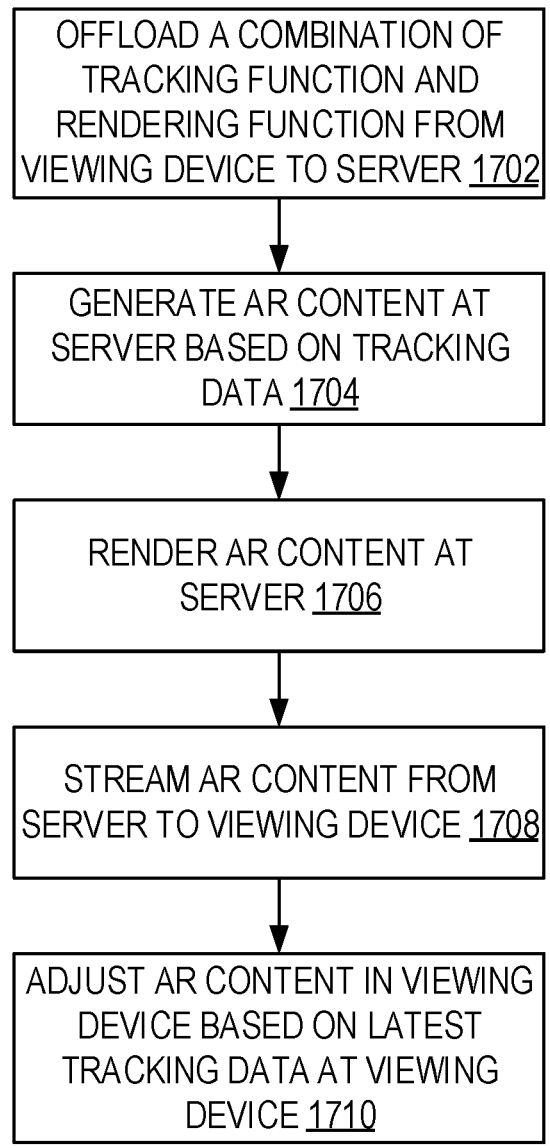
FIG. 17 is a flowchart illustrating an example operation of adjusting an augmented reality content based on updated tracking data at an AR display device.

FIG. 17 is a flowchart illustrating an example operation of adjusting AR content based on updated tracking data at a AR display device 101. At operation 1702, a combination of tracking function and rendering function are offloaded from an AR display device 101 to a server 110. At operation 1704, AR content is generated at the server 110 based on tracking data. At operation 1706, AR content is rendered at the server 110. At operation 1708, the rendered AR content is streamed from the server 110 back to the AR display device 101. At operation 1710, the rendered AR content is adjusted based on the latest tracking data from the AR display device 101. For example, a position of the rendered AR content is adjusted based on a recent motion of the AR display device 101.

Figure 18:
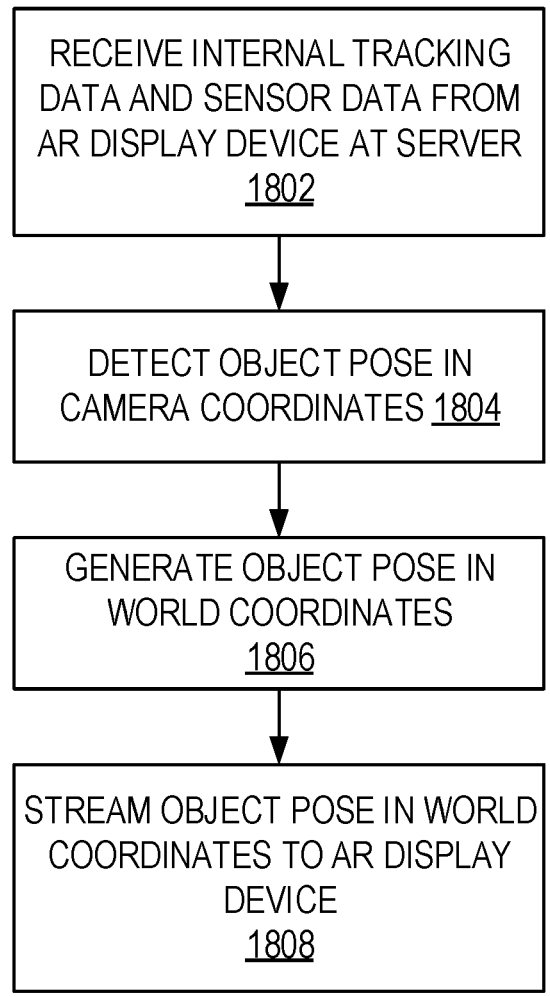
FIG. 18 is a flowchart illustrating an example operation of offloading tracking at a server.

FIG. 18 is a flowchart illustrating an example operation of offloading object detection. At operation 1802, the server 110 receives internal tracking data and sensor data (e.g., image data) from the AR display device 101. The AR display device 101 tracks its pose in the world and sends this pose together with the current sensor output to the remote server 110. At operation 1804, the server 110 detects an object pose with a reference frame or coordinates relative to the AR display device 101. At operation 1806, the server 110 fuses the object pose from operation 1804 with the object's pose in the world in order to obtain the desired pose of the object in the world coordinate system. At operation 1808, the server 110 sends the pose (in the word coordinate system) to AR display device 101, which can then render the object in the world coordinate system.

Figure 19:
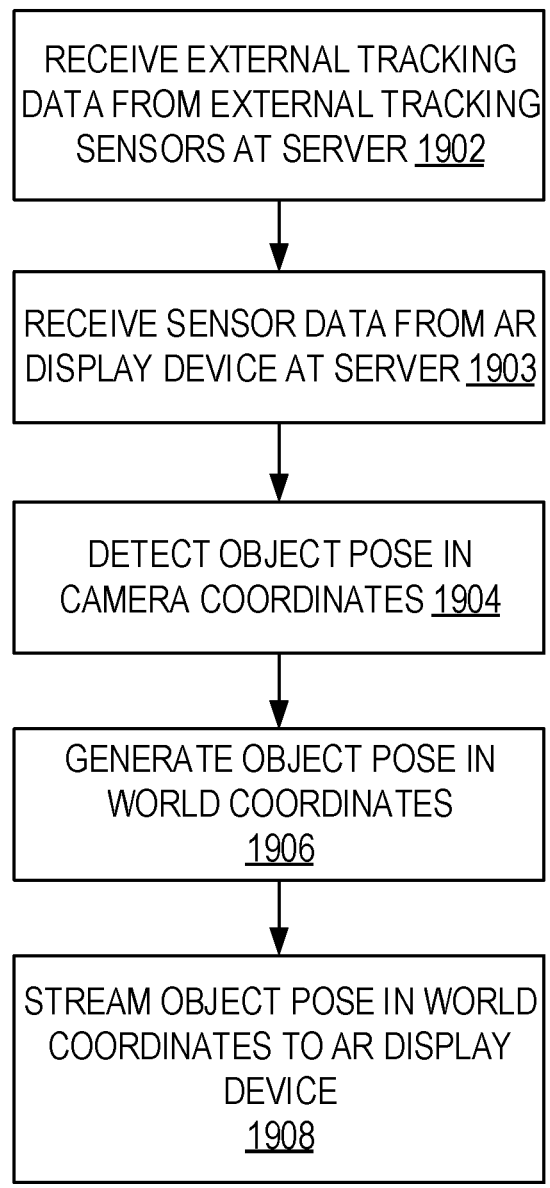
FIG. 19 is a flowchart illustrating an example operation of offloading tracking at a server.

FIG. 19 is a flowchart illustrating an example operation of offloading object detection. At operation 1902, the server 110 receives external tracking data from external tracking sensors 112. At operation 1903, the server 110 receives sensor data (e.g., image data) from the AR display device 101. At operation 1904, the server 110 detects an object pose with a reference frame or coordinates relative to the AR display device 101. At operation 1906, the server 110 fuses the object pose from operation 1904 with the object's pose in the world to generate the desired pose of the object in the world coordinate system. At operation 1908, the server 110 sends the pose (in the word coordinate system) to AR display device 101, which can then render the object in the world coordinate system.

Figure 20:
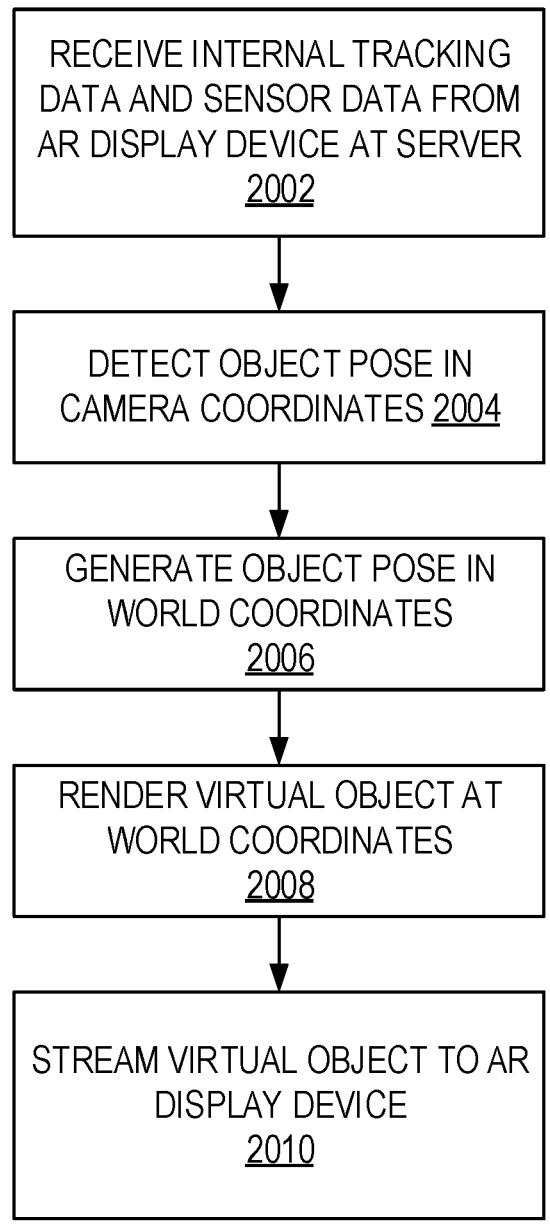
FIG. 20 is a flowchart illustrating an example operation of streaming object pose at a server.

FIG. 20 is a flowchart illustrating an example operation of offloading object detection. At operation 2002, the server 110 receives internal tracking data and sensor data (e.g., image data) from the AR display device 101. The AR display device 101 tracks its pose in the world and sends this pose together with the current sensor output to the remote server 110. At operation 2004, the server 110 detects an object pose with a reference frame or coordinates relative to the AR display device 101. At operation 2006, the server 110 fuses the object pose from operation 2004 with the object's pose in the world in order to obtain the desired pose of the object in the world coordinate system. At operation 2008, the server 110 renders a virtual object using the world coordinate system. At operation 2010, the server 110 streams the virtual object (in the word coordinate system) to AR display device 101, which can then render the object in the world coordinate system.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 108 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 21:
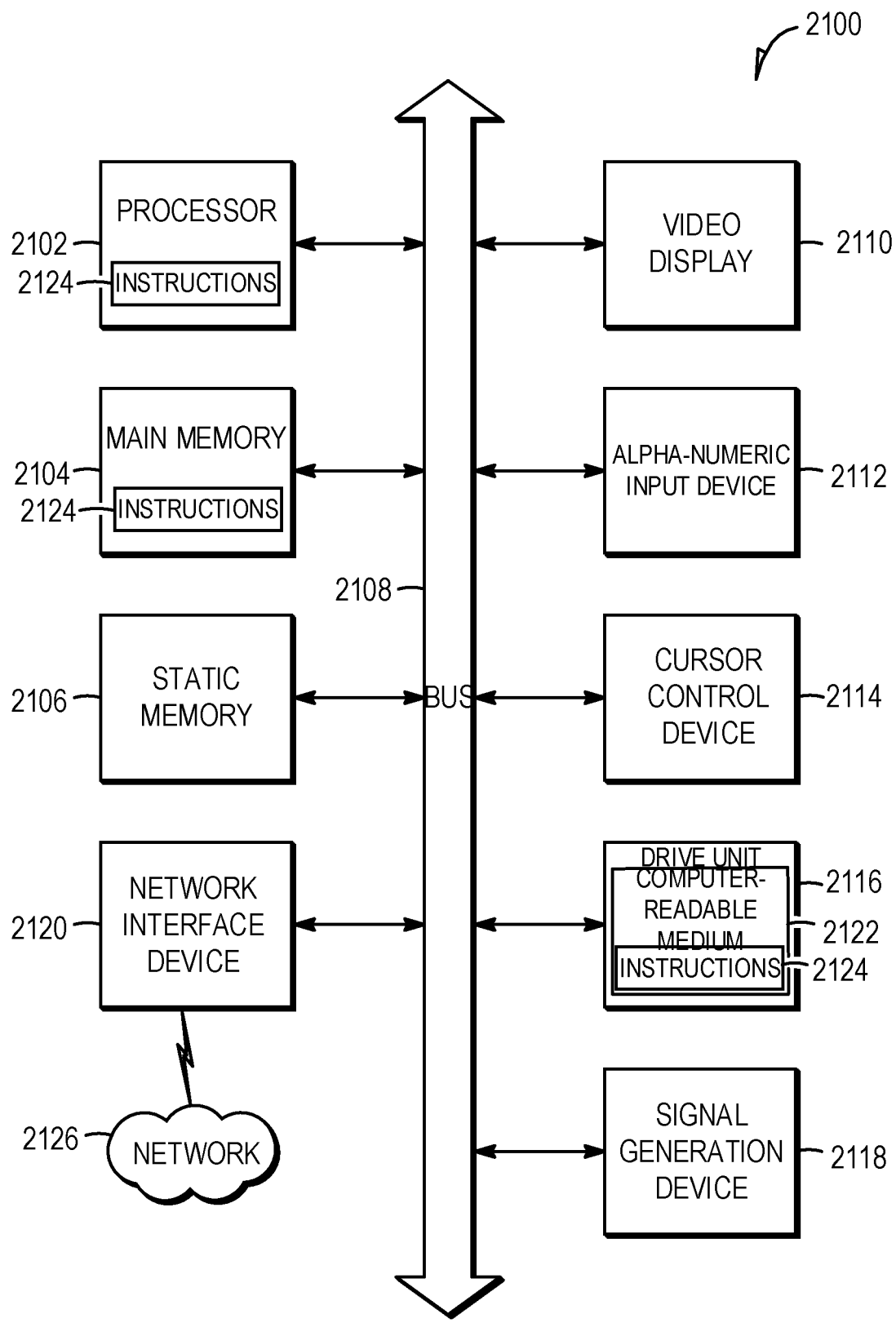
FIG. 21 is a block diagram illustrating components of a machine, according to some example embodiments, able to read instructions from a machine-readable medium and perform any one or more of the methodologies discussed herein.

FIG. 21 is a block diagram of a machine in the example form of a computer system 2100 within which instructions 2124 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server 110 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2100 includes a processor 2102 (e.g., a central processing unit (CPU), a graphics processing unit (GPU) or both), a main memory 2104, and a static memory 2106, which communicate with each other via a bus 2108. The computer system 2100 may further include a video display unit 2110 (e.g., a liquid crystal display (LCD) or a cathode ray tube (CRT)). The computer system 2100 also includes an alphanumeric input device 2112 (e.g., a keyboard), a user interface (UI) navigation (or cursor control) device 2114 (e.g., a mouse), a disk drive unit 2116, a signal generation device 2118 (e.g., a speaker), and a network interface device 2120.

Machine-Readable Medium

The disk drive unit 2116 includes a machine-readable medium 2122 on which is stored one or more sets of data structures and instructions 2124 (e.g., software) embodying or utilized by any one or more of the methodologies or functions described herein. The instructions 2124 may also reside, completely or at least partially, within the main memory 2104 and/or within the processor 2102 during execution thereof by the computer system 2100, the main memory 2104 and the processor 2102 also constituting machine-readable media. The instructions 2124 may also reside, completely or at least partially, within the static memory 2106.

While the machine-readable medium 2122 is shown in an example embodiment to be a single medium, the term "machine-readable medium" may include a single medium or multiple media (e.g., a centralized or distributed database, and/or associated caches and servers) that store the one or more instructions 2124 or data structures. The term "machine-readable medium" shall also be taken to include any tangible medium that is capable of storing, encoding or carrying instructions 2124 for execution by the machine and that cause the machine to perform any one or more of the methodologies of the present embodiments, or that is capable of storing, encoding or carrying data structures utilized by or associated with such instructions 2124. The term "machine-readable medium" shall accordingly be taken to include, but not be limited to, solid-state memories, and optical and magnetic media. Specific examples of machine-readable media 2122 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 2124 may further be transmitted or received over a communications network 2126 using a transmission medium. The instructions 2124 may be transmitted using the network interface device 2120 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 2124 for execution by the machine, and includes digital or analog communications signals or other intangible media to facilitate communication of such software.

Example Mobile Device

Figure 22:
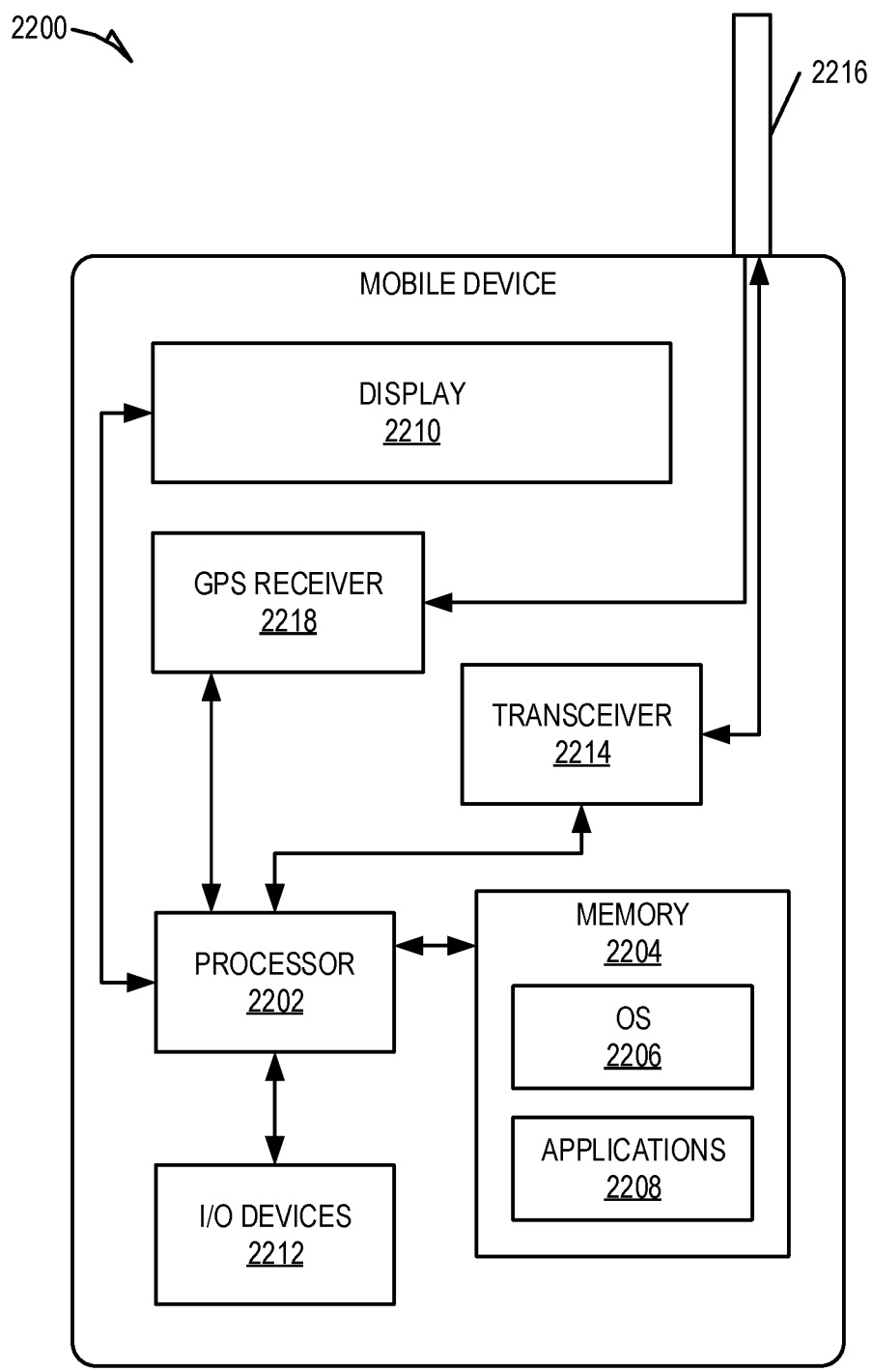
FIG. 22 is a block diagram illustrating a mobile device, according to an example embodiment.

FIG. 22 is a block diagram illustrating a mobile device 2200, according to an example embodiment. The mobile device 2200 may include a processor 2202. The processor 2202 may be any of a variety of different types of commercially available processors 2202 suitable for mobile devices 2200 (for example, an XScale architecture microprocessor, a microprocessor without interlocked pipeline stages (MIPS) architecture processor, or another type of processor 2202). A memory 2204, such as a random access memory (RAM), a flash memory, or other type of memory, is typically accessible to the processor 2202. The memory 2204 may be adapted to store an operating system (OS) 2206, as well as application programs 2208, such as a mobile location-enabled application that may provide location-based services to a user 102. The processor 2202 may be coupled, either directly or via appropriate intermediary hardware, to a display 2210 and to one or more input/output (I/O) devices 2212, such as a keypad, a touch panel sensor, a microphone, and the like. Similarly, in some embodiments, the processor 2202 may be coupled to a transceiver 2214 that interfaces with an antenna 2216. The transceiver 2214 may be configured to both transmit and receive cellular network signals, wireless data signals, or other types of signals via the antenna 2216, depending on the nature of the mobile device 2200. Further, in some configurations, a GPS receiver 2218 may also make use of the antenna 2216 to receive GPS signals.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, by a server system, first sensor data from a first sensor of an augmented reality display device, the first sensor data indicating a pose of the augmented reality display device relative to a first reference coordinate system;
   receiving, by the server system, second sensor data from a second sensor of the augmented reality display device;
   detecting, by the server system, a physical object using the second sensor data;
   determining, based on the second sensor data, a pose of the physical object relative to the augmented reality display device;
   determining the pose of the physical object relative to the first reference coordinate system based on the pose of the physical object relative to the augmented reality display device and the pose of the augmented reality display device relative to the first reference coordinate system; and
   providing the pose of the physical object relative to the first reference coordinate system to the augmented reality display device.

2. The method of claim 1, wherein the augmented reality display device is configured to render a virtual object corresponding to the physical object, and display the virtual object in a display of the augmented reality display device using the pose of the physical object relative to the first reference coordinate system.

3. The method of claim 2, wherein the virtual object is displayed in the display of the augmented reality display device independently from the pose of the physical object relative to the augmented reality display device.

4. The method of claim 1, further comprising:
   receiving, by the server system, third sensor data from a third sensor external to the augmented reality display device, the third sensor data indicating the pose of the augmented reality display device relative to the first reference coordinate system,
   wherein determining the pose of the physical object relative to the first reference coordinate system is based on the pose of the physical object relative to the augmented reality display device and, using the third sensor data, the pose of the augmented reality display device relative to the first reference coordinate system.

5. The method of claim 4, further comprising:
   rendering a virtual object based on the pose of the physical object relative to the first reference coordinate system; and
   providing the rendered virtual object to the augmented reality display device, wherein the augmented reality display device is configured to display the rendered virtual object based on the pose of the physical object relative to the first reference coordinate system.

6. The method of claim 1, further comprising:
   rendering a virtual object based on the pose of the physical object relative to the first reference coordinate system; and
   providing the rendered virtual object to the augmented reality display device, wherein the augmented reality display device is configured to display the rendered virtual object based on the pose of the physical object relative to the first reference coordinate system.

7. The method of claim 1, wherein the first sensor includes a visual odometry system configured to identify a position and an orientation of the augmented reality display device relative to the first reference coordinate system.

8. The method of claim 1, wherein the second sensor includes an optical sensor configured to generate second sensor data based on an image of the physical object captured by the optical sensor.

9. The method of claim 1, further comprising:
   receiving, by the server system, a request from the augmented reality display device to offload a tracking process of the augmented reality display device to the server system;
   in response to receiving the request, generating offloaded processed data based on the first sensor data and second sensor data; and
   providing the offloaded processed data to the augmented reality display device, the augmented reality display device configured to present, in a display of the augmented reality display device, virtual objects based on the offloaded processed data.

10. The method of claim 9, wherein third sensor data includes externally tracked data based on a location and an orientation of the AR display device relative to a third sensor that is external to the augmented reality display device, wherein the offloaded processed data is based on a combination of the first, second, and third sensor data.

11. A server system comprising:
    one or more computer processors; and
    one or more non-transitory computer-readable mediums storing instructions that, when executed by the one or more computer processors, cause the server system to perform operations comprising:
    receiving first sensor data from a first sensor of an augmented reality display device, the first sensor data indicating a pose of the augmented reality display device relative to a first reference coordinate system;

receiving second sensor data from a second sensor of the augmented reality display device;

detecting a physical object using the second sensor data;

determining, based on the second sensor data, a pose of the physical object relative to the augmented reality display device;

determining the pose of the physical object relative to the first reference coordinate system based on the pose of the physical object relative to the augmented reality display device and the pose of the augmented reality display device relative to the first reference coordinate system; and providing the pose of the physical object relative to the first reference coordinate system to the augmented reality display device.

12. The server system of claim 11, wherein the augmented reality display device is configured to render a virtual object corresponding to the physical object, and display the virtual object in a display of the augmented reality display device using the pose of the physical object relative to the first reference coordinate system.

13. The server system of claim 12, wherein the virtual object is displayed in the display of the augmented reality display device independently from the pose of the physical object relative to the augmented reality display device.

14. The server system of claim 11, wherein the operations further comprise:

receiving third sensor data from a third sensor external to the augmented reality display device, the third sensor data indicating the pose of the augmented reality display device relative to the first reference coordinate system, wherein determining the pose of the physical object relative to the first reference coordinate system is based on the pose of the physical object relative to the augmented reality display device and, using the third sensor data, the pose of the augmented reality display device relative to the first reference coordinate system.

15. The server system of claim 14, wherein the operations further comprise:

rendering a virtual object based on the pose of the physical object relative to the first reference coordinate system; and providing the rendered virtual object to the augmented reality display device, wherein the augmented reality display device is configured to display the rendered virtual object based on the pose of the physical object relative to the first reference coordinate system.

16. The server system of claim 11, wherein the operations further comprise:

rendering a virtual object based on the pose of the physical object relative to the first reference coordinate system; and providing the rendered virtual object to the augmented reality display device, wherein the augmented reality display device is configured to display the rendered virtual object based on the pose of the physical object relative to the first reference coordinate system.

17. The server system of claim 11, wherein the first sensor includes a visual odometry system configured to identify a position and an orientation of the augmented reality display device relative to the first reference coordinate system.

18. The server system of claim 11, wherein the second sensor includes an optical sensor configured to generate second sensor data based on an image of the physical object captured by the optical sensor.

19. The server system of claim 11, wherein the operations further comprise:

receiving a request from the augmented reality display device to offload a tracking process of the augmented reality display device to the server system;

in response to receiving the request, generating offloaded processed data based on the first sensor data and second sensor data; and providing the offloaded processed data to the augmented reality display device, the augmented reality display device configured to present, in a display of the augmented reality display device, virtual objects based on the offloaded processed data.

20. A non-transitory computer-readable medium storing instructions that, when executed by one or more computer processors of a server system, cause the server system to perform operations comprising:

receiving first sensor data from a first sensor of an augmented reality display device, the first sensor data indicating a pose of the augmented reality display device relative to a first reference coordinate system;

receiving second sensor data from a second sensor of the augmented reality display device;

detecting a physical object using the second sensor data;

determining, based on the second sensor data, a pose of the physical object relative to the augmented reality display device;

determining the pose of the physical object relative to the first reference coordinate system based on the pose of the physical object relative to the augmented reality display device and the pose of the augmented reality display device relative to the first reference coordinate system; and providing the pose of the physical object relative to the first reference coordinate system to the augmented reality display device.

* * * * *